(12) United States Patent
Yagyu et al.

(10) Patent No.: US 8,031,720 B2
(45) Date of Patent: Oct. 4, 2011

(54) PACKET TRANSFER SYSTEM, RADIO BASE STATION, AND PACKET TRANSFER ROUTE OPTIMIZATION METHOD

(75) Inventors: Kengo Yagyu, Yokohama (JP); Shinji Takeda, Yokohama (JP); Hidenori Aoki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 280 days.

(21) Appl. No.: 10/590,033

(22) PCT Filed: Feb. 17, 2005

(86) PCT No.: PCT/JP2005/002500
§ 371 (c)(1),
(2), (4) Date: May 8, 2007

(87) PCT Pub. No.: WO2005/079025
PCT Pub. Date: Aug. 25, 2005

(65) Prior Publication Data
US 2007/0280192 A1   Dec. 6, 2007

(30) Foreign Application Priority Data

Feb. 18, 2004   (JP) ................................. 2004-041604
Sep. 24, 2004   (JP) ................................. 2004-277495

(51) Int. Cl.
*H04L 12/28* (2006.01)
*H04L 12/56* (2006.01)
(52) U.S. Cl. .................. 370/395.31; 370/400; 370/401; 455/456.5; 455/456.6
(58) Field of Classification Search ................. 370/349, 370/351, 255, 256, 285, 331, 386, 395.3, 370/395.31, 400, 401, 408, 475, 485, 493–495; 455/436, 440, 445, 456.1, 456.5, 456.6, 560, 561

See application file for complete search history.

(56) References Cited

U.S. PATENT DOCUMENTS 5,371,738 A * 12/1994 Moelard et al. ............... 370/331
(Continued)

FOREIGN PATENT DOCUMENTS

EP   0 849 974 A2   6/1998
(Continued)

OTHER PUBLICATIONS

Takashima, Ichiro et al., "An Expanded Spanning-Tree Protocol for Home-Oriented Network Management", IEEE Transactions on Consumer Electronics, vol. 37, No. 3, pp. 379-387, Aug. 1991.

(Continued)

*Primary Examiner* — Aung S Moe
*Assistant Examiner* — Benjamin H Elliott, IV
(74) *Attorney, Agent, or Firm* — Oblon, Spivak, McClelland, Maier & Neustadt, L.L.P.

(57) ABSTRACT

A fault-tolerant packet transmission system is disclosed that can avoid localized load concentration on a specific portion of a network, while autonomously keeping route optimization, without adding a route control function to non-mesh devices. In a packet transmission system including multiple wireless base stations and one or more terminal devices belonging to one of the wireless base stations, each of the wireless base stations has a location table describing each of the terminal devices associated with a corresponding wireless base station to which the terminal device currently belongs. The wireless base stations exchange the information in the location table with each other to update the location tables and forward a received packet to the next hop along a transmission route toward a destination terminal device.

14 Claims, 25 Drawing Sheets

U.S. PATENT DOCUMENTS

| | | | |
|---|---|---|---|
| 5,487,065 A * | 1/1996 | Acampora et al. | 370/331 |
| 5,655,219 A * | 8/1997 | Jusa et al. | 455/338 |
| 5,872,773 A * | 2/1999 | Katzela et al. | 370/256 |
| 6,078,575 A * | 6/2000 | Dommety et al. | 370/338 |
| 6,473,411 B1 * | 10/2002 | Kumaki et al. | 370/331 |
| 6,603,769 B1 * | 8/2003 | Thubert et al. | 370/401 |
| 6,721,275 B1 * | 4/2004 | Rodeheffer et al. | 370/238 |
| 6,785,552 B2 * | 8/2004 | Shinozaki et al. | 455/456.1 |
| 6,810,259 B1 * | 10/2004 | Zhang | 455/456.5 |
| 6,816,460 B1 * | 11/2004 | Ahmed et al. | 370/238 |
| 6,950,651 B2 * | 9/2005 | Seligmann | 455/417 |
| 6,961,575 B2 * | 11/2005 | Stanforth | 455/445 |
| 7,006,453 B1 * | 2/2006 | Ahmed et al. | 370/255 |
| 7,020,466 B2 * | 3/2006 | Fujii | 455/433 |
| 7,061,876 B2 * | 6/2006 | Ambe | 370/256 |
| 7,099,322 B1 * | 8/2006 | Frouin et al. | 370/390 |
| 7,158,497 B2 * | 1/2007 | Li et al. | 370/331 |
| 7,181,214 B1 * | 2/2007 | White | 455/435.1 |
| 7,209,739 B1 * | 4/2007 | Narayanabhatla | 455/426.2 |
| 7,254,400 B1 * | 8/2007 | Sakakura | 455/456.1 |
| 7,376,430 B2 * | 5/2008 | Matsuda | 455/456.2 |
| 7,436,784 B2 * | 10/2008 | Hashimoto | 370/258 |
| 7,751,360 B2 * | 7/2010 | Yagyu et al. | 370/328 |
| 2001/0027107 A1 * | 10/2001 | Shinozaki et al. | 455/456 |
| 2002/0138195 A1 * | 9/2002 | Watanabe | 701/207 |
| 2003/0002482 A1 * | 1/2003 | Kubler et al. | 370/352 |
| 2003/0013445 A1 * | 1/2003 | Fujiwara et al. | 455/435 |
| 2003/0053422 A1 * | 3/2003 | Ambe | 370/256 |
| 2003/0112810 A1 * | 6/2003 | Nakabayashi et al. | 370/401 |
| 2003/0134648 A1 * | 7/2003 | Reed et al. | 455/456 |
| 2003/0165117 A1 * | 9/2003 | Garcia-Luna-Aceves et al. | 370/238 |
| 2004/0156365 A1 * | 8/2004 | Suzuki et al. | 370/389 |
| 2005/0036500 A1 * | 2/2005 | Rodeheffer et al. | 370/401 |
| 2005/0243757 A1 | 11/2005 | Yagyu et al. | |
| 2007/0280192 A1 * | 12/2007 | Yagyu et al. | 370/349 |

FOREIGN PATENT DOCUMENTS

| | | |
|---|---|---|
| EP | 0 849 974 A3 | 6/1998 |
| JP | 1-129550 | 5/1989 |
| JP | 02-137544 | 5/1990 |
| JP | 02-214349 | 8/1990 |
| JP | 04-284749 | 10/1992 |
| JP | 8-37535 | 2/1996 |
| JP | 9-182146 | 7/1997 |
| JP | 2000-69046 | 3/2000 |
| JP | 2000-78147 | 3/2000 |
| JP | 2000-261499 | 9/2000 |
| JP | 2002-118597 | 4/2002 |
| JP | 2002-232448 | 8/2002 |
| JP | 2002-247634 | 8/2002 |
| JP | 2002-534842 | 10/2002 |
| JP | 2002-369239 | 12/2002 |
| JP | 2003-69625 | 3/2003 |
| JP | 2003-152786 | 5/2003 |
| JP | 2003-188811 | 7/2003 |
| JP | 2003-348130 A | 12/2003 |
| JP | 2005-6264 | 1/2005 |
| KR | 2001-0062686 | 7/2001 |
| WO | WO 00/39967 | 7/2000 |

OTHER PUBLICATIONS

Takashima, Ichiro et al., "An Expanded Spanning-Tree Protocol for Home-Oriented Network Management", IEEE 1991 International Conference on Consumer Electronics, pp. 84-85, Jun. 5-7, 1991.

Karim El Malki, et al., "Hierarchical Mobile IPv4/v6 and Fast Handoffs", Mobile-IP Working Group Internet-Draft, Mar. 10, 2000, 19 pages.

"IP Mobility Support", Network Working Group Request for Comments: 2002, Oct. 1996, 62 pages.

S. Corson, et al., "Mobile Ad hoc Networking (MANET): Routing Protocol Performance Issues and Evaluation Considerations", Network Working Group Request for Comments: 2501, Jan. 1999, pp. 1-12.

"IEEE Standard for Information technology—Telecommunications and information exchange between systems—Local and metropolitan area networks—Common specifications", ANSI/IEEE STD 802.1D, 1998, Cover page, pp. iv-xix and pp. 1-355.

C. Perkins, et al., "Ad hoc On-Demand Distance Vector (AODV) Routing", Network Working Group, Request for Comments: 3561, Category: Experimental, Jul. 2003, pp. 1-37.

* cited by examiner

PRIOR ART

FIG.4

| ROOT BRIDGE | TREE ID | PREVIOUS NODE | NEXT NODE |
|---|---|---|---|
| Bridge a | Tree A | Bridge a | – |
| Bridge b | Tree B | Bridge b | Bridge f |
| Bridge c | Tree C | Bridge c | Bridge f |
| Bridge d | Tree D | – | Bridge a<br>Bridge b<br>Bridge c<br>Bridge f |
| Bridge e | Tree E | Bridge a | Bridge c |
| Bridge f | Tree F | Bridge f | Bridge b<br>Bridge c |

FIG.5

| | To DS | From DS | ADDRESS 1 | ADDRESS 2 | ADDRESS 3 | ADDRESS 4 |
|---|---|---|---|---|---|---|
| STA→BRD | 1 | 0 | ADDRESS OF RECEIVING NODE | SOURCE ADDRESS | DESTINATION ADDRESS | RESERVED |
| BETWEEN BRDs | 1 | 1 | ADDRESS OF RECEIVING NODE | ADDRESS OF TRANSMITTING NODE | DESTINATION ADDRESS | SOURCE ADDRESS |
| BRD→STA | 0 | 1 | ADDRESS OF RECEIVING NODE | ADDRESS OF TRANSMITTING NODE | SOURCE ADDRESS | RESERVED |

FIG.10A

| Bridge | Signal | Queue size | Error Rate |
|---|---|---|---|
| a | −15dbm | 30k[bit] | $10^{-6}$ |
| b | −30dbm | 65k[bit] | $10^{-5}$ |
| c | −48dbm | 12k[bit] | $10^{-8}$ |
| e | −65dbm | 240k[bit] | $10^{-3}$ |

FIG.10B

| Bandwidth (Mbps) | link cost |
|---|---|
| 10 | 2,000,000 |
| 100 | 200,000 |
| 1000 | 20,000 |
| 10,000,000 | 2 |

| TARGET BS (ON THE DESTINATION SIDE) | NEXT HOP |
|---|---|
| A | A |
| C | C |
| D | D |
| E | A |
| F | C |

- Payload=1000 bytes 1 hop : 1510 × 1 = 1510 μs   →   5.3Mbps
  2 hops:  454 × 2 =  908 μs        8.6Mbps

- Payload=100 bytes 1 hop : 310 × 1 = 310 μs   →   2.6Mbps
  2 hops: 189 × 2 = 378 μs        1.9Mbps

OPTIMUM ROUTE VARIES DEPENDING ON PAYLOAD SIZE

| DESTINATION | ROUTE |
|---|---|
| A | – |
| B | B |
| C | B → C |
| D | B → C → D |
| E | F → E |
| F | F |

FIG.21B

| DESTINATION | ROUTE |
|---|---|
| A | – |
| B | B |
| C | B → C |
| D | B → C → D |
| E | B → C → D → E |
| F | F |

FIG.22A

| DESTINATION | NEXT NODE |
|---|---|
| A | – |
| B | B |
| C | B |
| D | B |
| E | F |
| F | F |

FIG.22B

| DESTINATION | NEXT NODE |
|---|---|
| A | - |
| B | B |
| C | B |
| D | B |
| E | B |
| F | F |

1 : A→F→E
2 : A→B→C→E
3 : A→B→C→D→E

Cost1 = AF+FE = 310+310 = 620
Cost2 = AB+BC+CE = 189+189+310 = 688
Cost3 = AB+BC+CD+CE = 756

Cost1 = AF+FE = 1510+1510 = 3020
Cost2 = AB+BC+CE = 454+454+1510 = 2418
Cost3 = AB+BC+CD+CE = 454+454+454+454 = 1816

PACKET TRANSFER SYSTEM, RADIO BASE STATION, AND PACKET TRANSFER ROUTE OPTIMIZATION METHOD

FIELD OF THE INVENTION

The present invention relates to a packet transmission technique for realizing wireless transmission of packets between network segments, and more particularly, to a packet transmission system and a wireless base station used in the packet transmission system, in which wireless base stations autonomously structure a network and exchange table information describing one or more terminal devices currently located under the wireless base stations to control the transmission routes, without requiring a specific management node or additional device functions, while preventing localized load concentration. The invention also relates to route optimization for packet transmission.

BACKGROUND OF THE INVENTION

A network that allows two or more mobile devices to link up spontaneously to conduct mutual communication is called an ad-hoc wireless network, a multi-hop wireless network, or a wireless mesh network. Such a network does not require a specific control station, and the devices define a self-organized local network by themselves. In an ad hoc wireless network, terminal devices that cannot communicate directly with each other can transmit and receive packets via a third terminal device located between them, while keeping the transmit power levels low. The communication range can be expanded with this arrangement. In fact, several routing protocols for controlling packet transmission routes are proposed as the Internet standard of ad hoc wireless networks. (See, for example, Non-patent Publication 1 listed below.)

With the communication scheme disclosed in this publication, all the terminal devices participating in the network need to have a packet transfer function. In other words, those devices with inferior functions cannot participate in the network, and a cost-increase problem due to furnishing additional functions arises.

It is also proposed to provide one or more terminal devices that serve as location management agents to manage the locations of mobile communication devices. (See, for example, Non-patent Publication 2 listed below). When a mobile communication device has moved, the agent device of the original location and the agent device of the new location encapsulate the communication route between them to make the route transparent for the network. A communication node that wants to communicate with the mobile communication device can access this mobile communication device via the location management agent. Therefore, the mobile communication device can participate in the network without a packet transfer function.

It is also proposed to arrange the location management agents in a hierarchy to allow a mobile communication device to communicate only with a lower-layer agent when the device is moving in a short range in order to reduce overhead when location management agents are not nearby. (See, for example, Non-patent Publication 3 listed below.)

On the other hand, in a wired network, packets are transmitted between different network segments using bridges, and a packet transmission technique based on a spanning tree protocol is known. (See, for example, Non-patent Publication 4 listed below.) With this technique, a specific bridge or base station is selected as a root bridge, and a transmission tree extending from the root bridge is created using the spanning tree protocol to prevent a loop and realize a fault-tolerant system.

An example of the transmission tree in a wired network is illustrated in FIG. 1. Bridge 1 is selected as a root bridge, and a nonloop transmission tree is created from the root bridge. The nodes to which packets are transmitted are recorded in a learning table, in association with the radio interfaces.

In order to apply the above-described packet transmission technique using wired bridges to a wireless network, multiple wireless interfaces have to be provided to each of the nodes through which packets are transmitted. This attempt further requires an antenna and a modulation and demodulation circuit to be added to each of the interfaces, and is disadvantageous on the cost front.

To overcome this problem, a technique for virtually providing multiple wireless interfaces by regarding the address of the correspondent node as a virtual interface is proposed. (See, for example, Patent-related Publication 1 listed below.) This method allows the concept of wired network spanning tree to be applied to packet transmission in a wireless network, using substantially a single wireless interface. Each of the wireless base stations is furnished with an address table, in which table the address of the correspondent node is recorded in association with the next node to which the packet is to be transmitted.

Another technique is also proposed to reduce redundancy of packet transmission routes, making use of the feature of wireless communications, that is, the fact that packets can reach a wireless station as long as that wireless station is located within the communication range, even if the station is not the correspondent node. (See, for example, Patent-related Publication 2 listed below.) With this technique, each wireless station monitors packets approaching that station along a tree-like transmission route. A table is created to record the source device indicated by the source address contained in the packet, in association with the previous wireless node (or base station) indicated by the address of the transmitting station. Using the table, a shorter route can be selected in packet transmission.

Still another technique is proposed to determine whether the power level of the signal received from a base station is at or above a threshold level when creating a transmission tree, and not to establish a link if the detected power level is below the threshold in order to improve the communication quality. (See, for example, Patent-related Publication 3 listed below.)

By the way, it is necessary for an ad hoc wireless network to select the optimum route in a short time when transmitting packets or creating a transmission tree if such a tree is used. However, in wireless communication channels, the network environment and conditions are likely to change, compared with wired communication channels. Accordingly, it is proposed to introduce a weighting value reflecting the bit error rate and the transmission rate between adjacent wireless devices (or wireless base stations) in determining the optimum route. (See, for example, Patent-related Publication 4 listed below.) The weighting values set in the links between adjacent devices are successively added up to determine the optimum route.

Non-patent Publication 1: S. Corson and J. Macker, "Mobile Ad hoc Networking (MANET): Routing Protocol Performance Issues and Evaluation Considerations", Internet standard RFC 2501, January 1999

Non-patent Publication 2: C. Perkins, "IP Mobility Support", Internet Standard RFC 2002, October 1996

Non-patent Publication 3: K. Malki and H. Soliman, "Hierarchical Mobile IPv4/v6 and Fast Handoffs" INTERNET DRAFT, March 2000
Non-patent Publication 4: ISO/IEC 10038, ANSI/IEEE Std802.1D, "Information Technology, Telecommunications and Information Exchange between Systems, Local Area Networks, Media Access Control (MAC) Bridges", 1993.
Patent-related Publication 1: JP 2000-69046A
Patent-related Publication 2: JP 2000-78147A
Patent-related Publication 3: JP 2003-188811A
Patent-related Publication 4: JP 2003-152786A

SUMMARY OF THE INVENTION

Technical Problem to be Solved by the Invention

The packet transmission routing protocol proposed by Non-patent Publication 1 requires all the devices forming the network to be furnished with packet transfer functions. In other words, devices with only less sophisticated functions cannot participate in the network, and extra funds for adding functions or equipment are needed.

With the technique disclosed in Non-patent Publication 2, the communication workload via a location management agent is likely to increase, and the wireless resources are consumed. It is anticipated that, in the unsteady and changeable mobile wireless communication environment, wireless communication failure with the location management agent is likely to occur.

Non-patent Publication 3 tries to distribute the traffic load by increasing the number of location management agents; however, the location management agent at the original location of a mobile communication device is determined in advance, and it is impossible to keep the optimum arrangement of the location management agents all the time under the situation where mobile communication devices freely move around.

Patent-related Publication 1 tries to apply the concept of wired packet transmission disclosed in ANSI/IEEE Std. 802 to a wireless packet network, and a single transmission tree is used in a wireless network, as illustrated in FIG. 2. In this example, a tree indicated by the bold arrows extends from root Bridge "a". When transmitting a packet from Station S, which currently exists under Bridge b, to Station D, which currently belongs to Bridge c, the packet is transmitted through Bridge x7, Bridge x8, Bridge a, Bridge x3, and Bridge X4 along the route indicated by the dashed arrow. With this configuration, problems of route redundancy and concentration of load arise.

With the packet transmission technique disclosed in Patent-related Publication 2, the packet transmission route can be shortened by monitoring at a node those packets approaching that node. However, load concentration occurs at the root bridge of the transmission tree. Consequently, the entire network efficiency is lowered.

In the packet transmission technique disclosed in Patent-related Publication 3, the determination whether to establish a channel between adjacent wireless base stations is made based on the power level of the received signal. However, the actual wireless communication environment changes easily, and wireless interfaces that adaptively change the communication rates according to the environment are also used. The technique shown in this publication cannot estimate the link cost reflecting the communication rate. Consequently, the throughput of the network is lowered as a whole, and the network connectivity is degraded.

The route optimization method disclosed in Patent-related Publication 4 considers the change in the wireless environment. However, it does not consider overhead with respect to the data transmission time, which overhead changes depending on the size (or the length) of the payload of a packet.

With the conventional packet transmission methods in the third layer, wireless devices not having bridging functions cannot participate in the network. On the other hand, packet transmission methods using bridges in the media access control (MAC) layer are still in the process of development for application to wireless networks. When using a transmission tree in a wireless network, localized load concentration cannot be avoided.

Therefore, it is an object of the present invention to provide a packet transmission technique in an ad hoc wireless network that can achieve improved network efficiency through determination of the optimum route, while avoiding localized load concentration, regardless of the functionalities of wireless devices.

Means for Solving the Technical Problem

One method for preventing concentration of traffic load and optimizing packet transmission in an ad hoc network is to relate each of the wireless base stations to wireless devices located under that wireless base station to allow autonomous routing control among the wireless base stations.

Another method is that the payload size of a packet is taken into account, in addition to the radio environment of the network, during the route search to optimize the packet transmission route.

With the former method, each of the wireless base stations structuring a network has a table for recording all the wireless base stations in the network, each being associated with terminal devices currently located under that wireless base station, and the table information is autonomously exchanged between wireless base stations. With this structure, when a first terminal device tries to communicate with a second terminal device, the first terminal device does not have to access a specific management node that manages the location of the terminal devices because each of the wireless base stations can determine a target wireless base station under which the destination terminal device is currently located and because optimum routing control can be performed among the wireless base stations.

In this case, the wireless base stations (regardless of whether a mobile type or a fixed type) serve as wireless bridges and are furnished with a packet transfer function, and less sophisticated terminal devices are connected to the closest wireless base station to allow the terminal devices to participate in the network regardless of the abilities of the terminal devices. If a terminal device has a packet transfer function, that terminal device may serve as a wireless bridge.

With the latter method, the payload size of a packet is reflected in the link cost when creating and/or updating a transmission tree, regardless of existence or absence of a transmission tree, or regardless of the number of transmission trees. The optimum transmission route can be determined according to the actual conditions of the radio channel for packet transmission.

In the first aspect of the invention, a packet transmission system that includes a plurality of wireless base stations or mesh access points (MAPs), and one or more terminal devices or stations (STAs) belonging to one of the wireless base stations is provided. In this system, each of the wireless base stations has a location table in which each of the wireless base stations is recorded in association with terminal devices currently located under that wireless base station if there are. The location table information is exchanged among the wireless base stations so as to allow each of the wireless base stations to determine a target wireless base station under which a destination terminal device is located. Each of the wireless base stations updates its location table using the exchanged table information. Upon receiving a packet, a wireless base station forwards the packet to a neighbor base station that functions as a relay node to the destination terminal device based on the updated location table.

In determining an appropriate transmission route, either the following means (1) or (2) may be employed.

(1) A location table is provided to each of the wireless base stations (MAPs), in which table terminal devices (STA) are recorded in association with the corresponding MAPs under which the terminal devices are currently located. When receiving a packet, each of the wireless base stations (MAPs) identifies the first bridge (MAP) under which the source terminal device is currently located or the last bridge (MAP) under which the destination terminal is currently located, from the location table, based on the source address or the destination address, respectively, contained in the received packet. Then, a transmission route leading to the specified base station (MAP) is determined, and the packet is transferred to the next hop along the determined route.

(2) Two or more transmission trees are used in the system. The ID information of the currently used transmission tree, or the address information of the wireless base station serving as the root bridge (MAP), is contained in the packet. When receiving the packet, each of the wireless bridges determines the transmission tree from the transmission tree ID information or the root bridge address information contained in the packet.

The transmission tree used in the packet transmission system may be created based on a link cost reflecting the radio channel conditions, such as the power level of the received signal, the error rate, or the delay.

In the second aspect of the invention, a wireless base station used in a wireless packet transmission system is provided. The wireless base station includes:

(a) a location table recording wireless base stations included in the packet transmission system, each of the wireless base stations being associated with one or more terminal devices currently located under that wireless basestaion if there are any;

(b) a route control table configured to record route information as to transmission routes used in the packet transmission system in association with a certain wireless basestaion that corresponds to a source terminal or a destination terminal;

(c) a packet receiving unit configured to receive a packet;

(d) a route determination unit configured to determine a transmission route to be used to transfer the received packet based on the received packet; and (e) a packet transmission unit configured to forward the received packet to a next node along the determined transmission route by referring to the route control table.

In the third aspect of the invention, a wireless base station used in a wireless packet transmission system using two or more transmission trees is provided. The wireless base station includes:

(a) a tree table configured to record information about two or more transmission trees in association with corresponding root bridges;

(b) a packet receiving unit configured to receive a packet;

(c) a tree determination unit configured to determine the transmission tree used for the currently received packet; and (d) a packet transmitting unit configured to transmit the received packet to the next node along the determined transmission tree, referring to the tree table.

In the fourth aspect of the invention, a method for optimizing a packet transmission route in a wireless network is provided. The method includes the steps of:

(a) setting a plurality of transmission trees corresponding to a plurality of criteria as to the packet size at each of the wireless base stations in the network, each transmission tree describing destination information in association with a transmission route;

(b) determining the packet size when receiving the packet at one of the wireless base stations; and (c) specifying a next node to which the packet is to be transmitted, with reference to one of the transmission trees based on the determined packet size.

Since the route is determined taking into account the packet size, in addition to the transmission rate and/or other factors, the packet can be transmitted along the optimum route with reduced overhead.

ADVANTAGES OF THE INVENTION

Because each of the wireless base stations included in a packet transmission system manages terminal devices located under any one of the wireless base stations, an arbitrary wireless terminal device can participate in the network without installation of additional functions required to participate in route control between wireless bridges.

It is unnecessary to provide a special location management node, and therefore, traffic concentration on this special node can be avoided. In addition, network disconnection due to failure of the location management node can be avoided.

By reflecting the payload size of a packet and wireless channel conditions in estimation of the link cost, route optimization taking the network environment and the packet size into account can be realized.

BRIEF DESCRIPTION OF THE DRAWINGS

FIG. 4 illustrates an example of the tree table held in each of the wireless base stations in the wireless network;

FIG. 5 illustrates an example of the packet format of the address portion of a packet used in the wireless network shown in FIG. 3;

FIG. 10A illustrates an example of the link cost table used to create a transmission tree according to an embodiment of the invention, and FIG. 10B illustrates a conventional fixed cost table;

FIG. 21B is an example of the long packet routing table, in which table all the nodes along the route are described;

FIG. 22A is an example of the short packet routing table, in which table only the next hop is described;

FIG. 22B is an example of the long packet routing table, in which table only the next hop is described.

LIST OF NUMERICAL SYMBOLS 10A, 10B, 30, 50: Wireless Base station (Access Point)
11, 31, 51: Transmitting/Receiving Unit
12: Tree Table
13A 13B: Tree Determination Unit
14, 35, 55: Packet Checking Unit
16, 36: Location Table
20, 60: Cost Estimation Unit
32: Route Control Table
56: Packet Size Determination Unit
57: Short Packet Table (Route Control Table)
58: Long Packet Table (Route Control Table)

BEST MODE FOR IMPLEMENTING THE INVENTION

The preferred embodiments of the present invention are now described in detail in conjunction with the attached drawings.

First, the first embodiment of the invention is described with reference to FIG. 3 through FIG. 12. In the first embodiment, two or more transmission trees are set up in a wireless network to optimize packet transmission.

Figure 3:
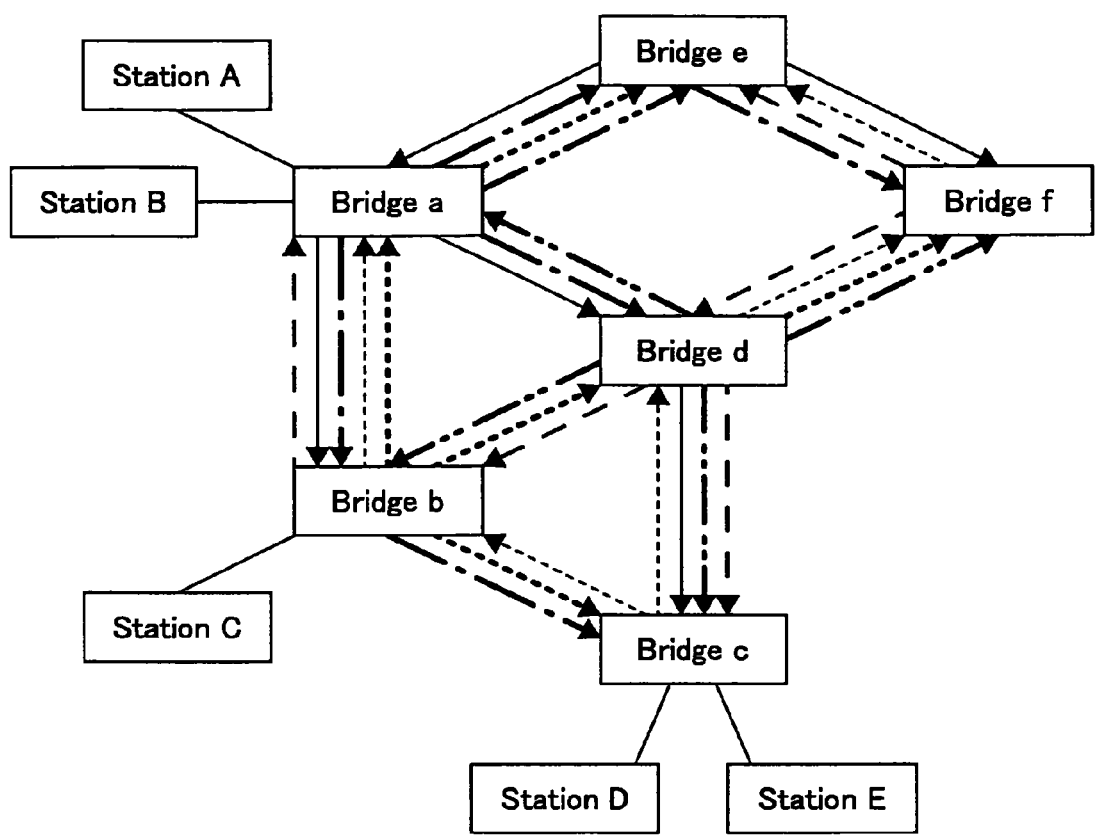
FIG. 3 is a diagram used to explain a packet transmission system according to the first embodiment of the invention, in which multiple transmission trees are created using different wireless base stations as the root stations.

FIG. 3 is a schematic diagram illustrating multiple transmission trees created in a network including multiple wireless bridges (base stations or access points). By allowing the network to have multiple transmission trees with multiple wireless base stations functioning as the root bridges, the throughput of the entire network is improved, and the packet transmission route can be shortened. In the first embodiment, explanation is made using a wireless LAN based on the IEEE 802.11 standard as the example.

In FIG. 3, Bridges (a-f) are wireless basestaions that form a wireless network in which packets are transmitted along the transmission trees. Stations (A-E) are terminal devices, which are wireless terminals in this example. Bridges (the wireless base stations) may be either of a mobile type or a fixed type. Each of Stations A-E can be connected to one of Bridges a-f in either a wireless manner or a wired manner.

Although, in the example shown in FIG. 3, transmission trees are created using all the wireless base stations (Bridges) a-f as root bridges, it is not always necessary to use all the wireless base stations as root bridges. Inefficient transmission trees may be eliminated, taking the network size and/or the overhead into account.

Each of the wireless base stations (Bridges) a-f has a tree table, in which the identification (ID) information of each of the transmission tress is recorded in association with the root bridge, together with the adjacent bridges (nodes) along the transmission tree.

FIG. 4 illustrates an example of the tree table held by Bridge d shown in FIG. 3. The table records the ID of the transmission tree and the adjacent bridges (the previous node and the next node) along the transmission tree, for each of the root bridges.

When using multiple transmission trees in a wireless network, each of the wireless base stations (bridges) determines which transmission tree is to be used for the currently transmitted packet when a packet is received. There are two methods for determining which transmission tree.

(1) The first method is to provide a location table to each of the wireless bridges. The location table records the terminal devices in association with the corresponding bridges under which the terminal devices currently exist. When receiving a packet, each of the wireless bridges identifies the first wireless bridge to which the source terminal currently belongs or the last wireless bridge to which the destination terminal currently belongs, based on the source address or the destination address contained in the received packet, with reference to the location table. Then, a transmission tree having the identified wireless bridge as the root is selected, and the packet is transmitted to the next bridge (node) according to the selected transmission tree.

(2) The second method is to write information about which transmission tree is used in the packet. The information may be written by the source terminal or the wireless bridge that first receives the packet from the source terminal. As the information, the transmission tree ID or the address of the root bridge of the transmission tree may be written.

The first and second methods are described in more detail below. When the transmission tree is determined, the wireless bridge transmits the packet to the next node (bridge) according to the transmission tree. By using multiple transmission trees in the wireless network, route optimization is performed efficiently, and the packet transmission route can be shortened. In addition, load concentration on a specific wireless bridge can avoided, and the network efficiency can be improved as a whole.

FIG. 5 illustrates an example of the address format of a packet transmitted and received in the wireless network shown in FIG. 3. The top line of FIG. 5 shows the address fields of a packet transmitted from a terminal device (Station) to a wireless bridge (Bridge), the middle line of FIG. 5 shows the address fields of a packet transmitted between wireless bridges, and the bottom line of FIG. 5 shows the address fields of a packet transmitted from a wireless bridge (Bridge) to a terminal device (Station).

The source address represents the address of wireless communication equipment that first generates and transmits the packet. The destination address represents the address of wireless communication equipment to which the packet is finally addressed. The address of a transmitting node represents the address of wireless communication equipment that transmits the packet along the transmission tree, and the address of a receiving node represents the address of wireless communication equipment that receives the packet along the transmission tree.

The symbol "DS" represents wireless communication equipment, "To" indicates a direction to the receiving side, and "From" indicates a direction from the transmitting side. If the field "To DS" is "0", a terminal device (wireless terminal) is on the receiving side. If the field "To DS" is "1", a wireless bridge is on the receiving side. If the field "From DS" is "0", a wireless terminal is on the transmitting side, and if the field "From DS" is "1", a wireless bridge is on the transmitting side. If both fields "To DS" and "From DS" are "1", then the packet is transmitted between adjacent wireless bridges. By inserting the "To DS" field and the "From DS" field in the packet, it can be determined whether the packet is currently being transmitted between bridges.

If, in the network shown in FIG. 3, Station A transmits a packet addressed to Station E, the packet is first received at Bridge a to which Station A is currently connected. In this case, the address format of the packet is one indicated at the top line of FIG. 4, containing the address of Station A as the source address and the address of Station E as the destination address. The address of Bridge "a" is inserted as that of the receiving node.

Bridge "b" that has received the packet from Bridge "a" adds the self address in the address field of the transmitting node, and adds the address of Bridge "c" (which is the next node) in the address field of the receiving node.

Figure 1:
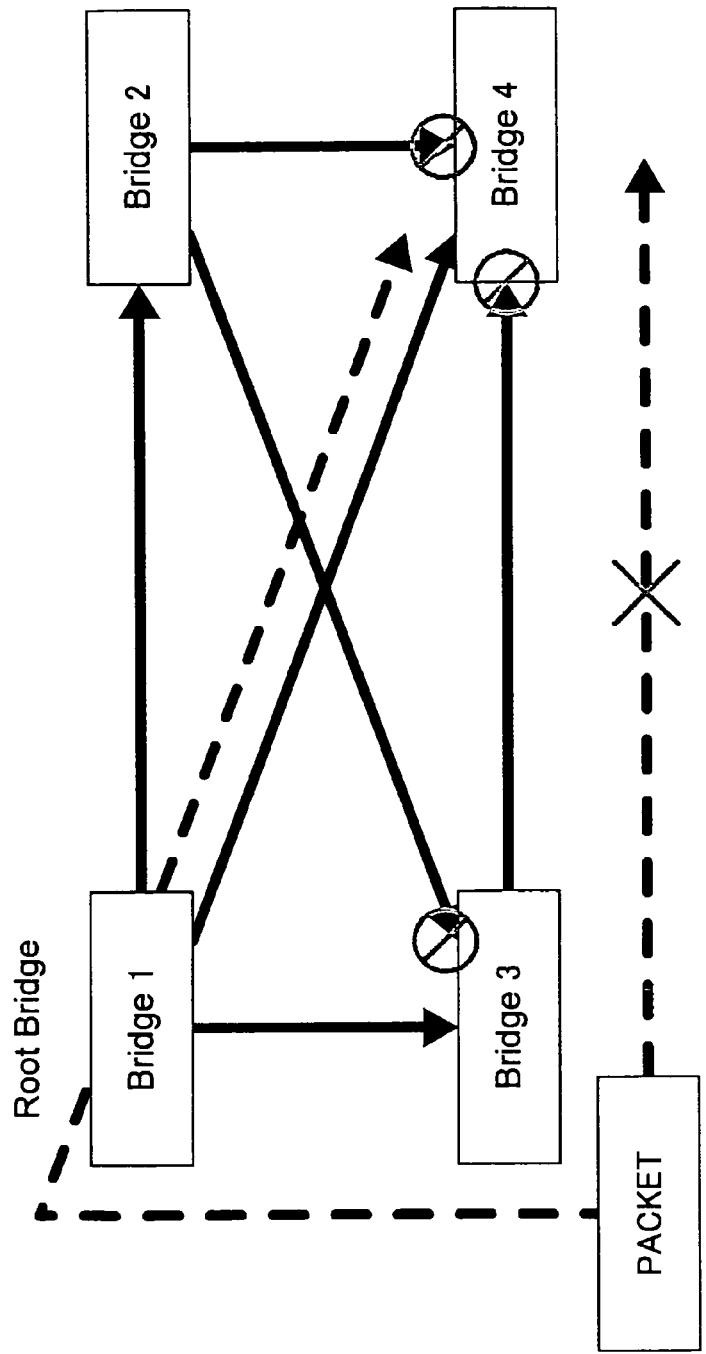
FIG. 1 illustrates an example of the nonloop transmission tree used in the conventional wired network.
Figure 2:
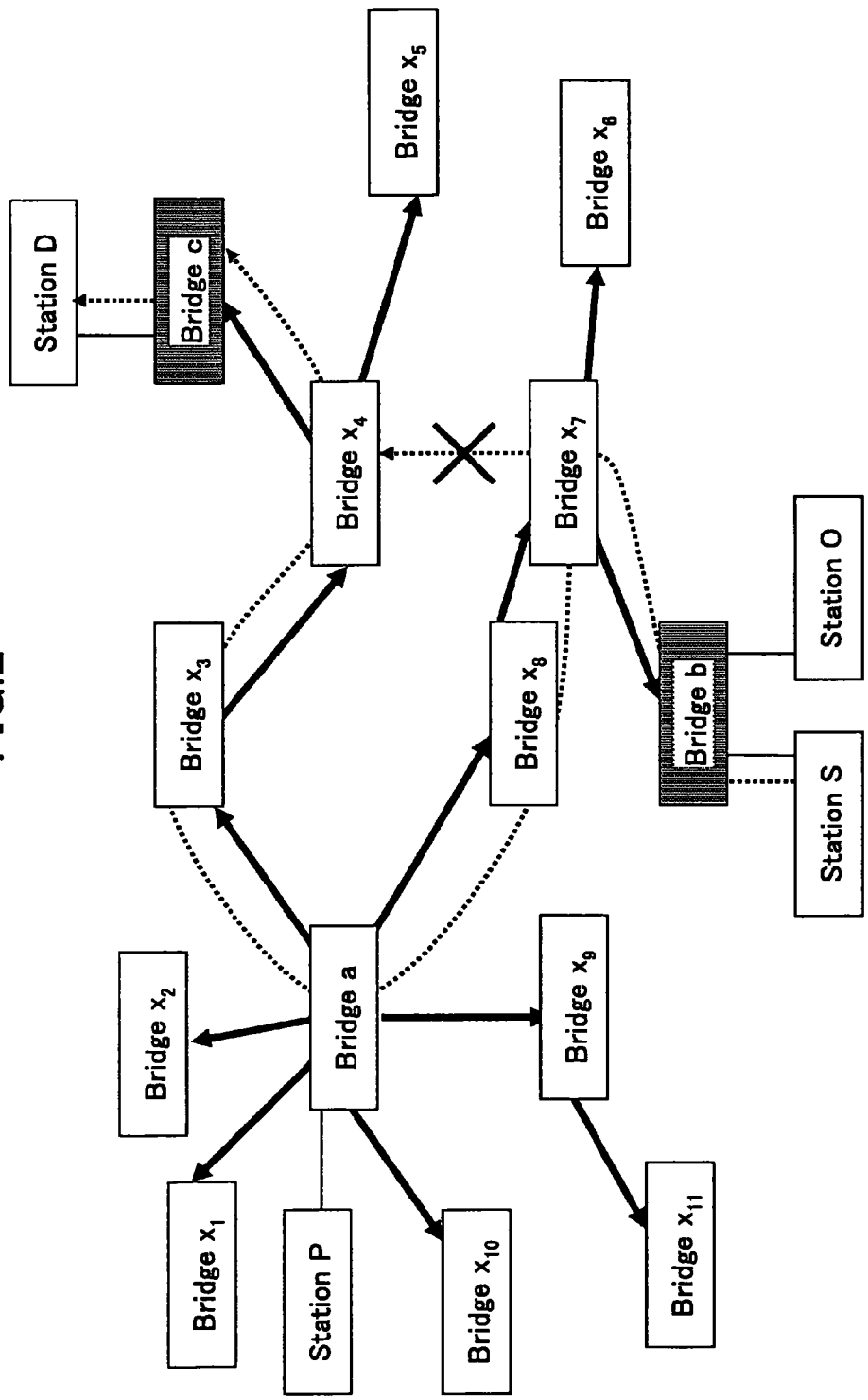
FIG. 2 illustrates an example of the transmission tree structure proposed in the conventional wireless network.
Figure 6:
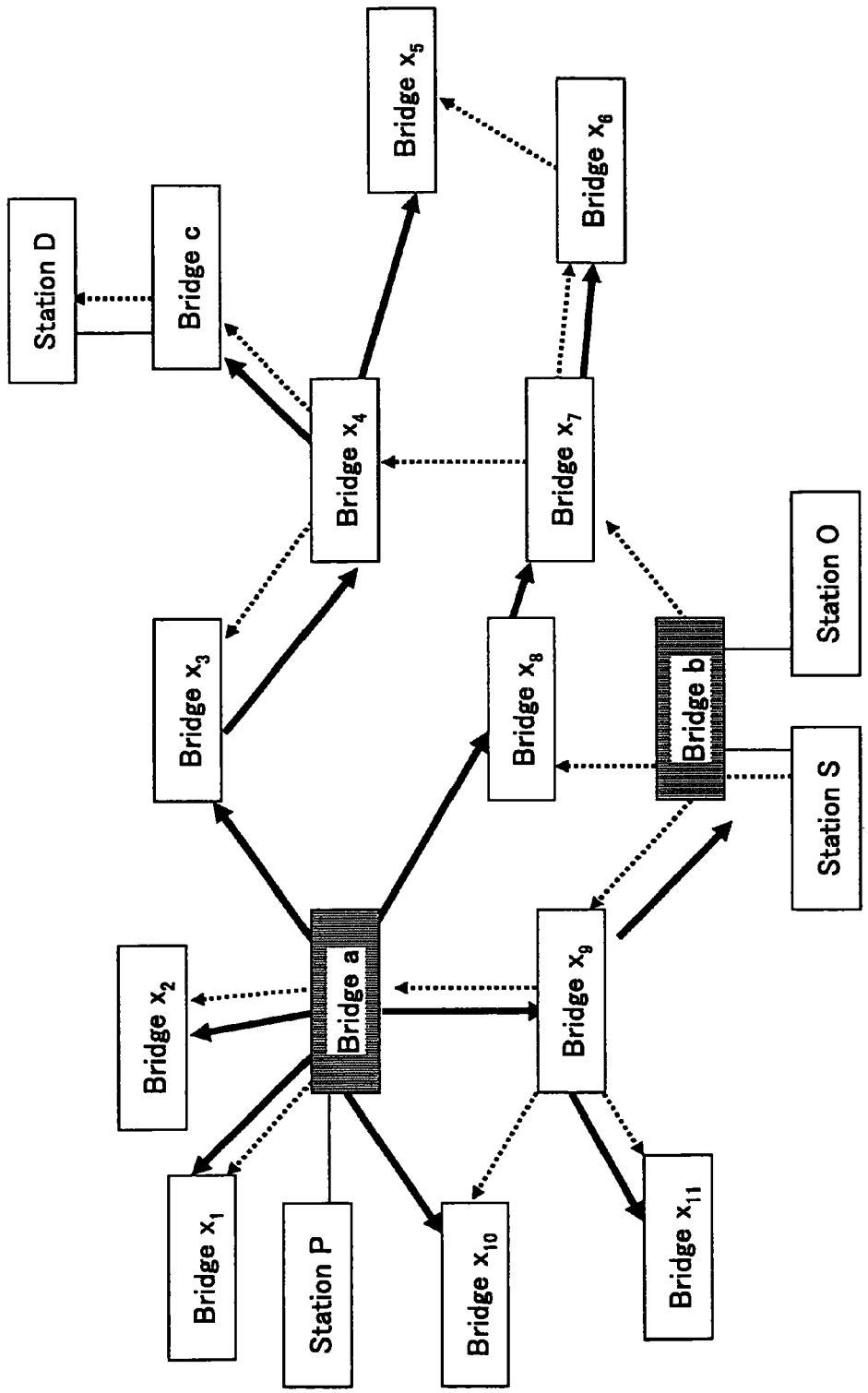
FIG. 6 illustrates an example of the transmission tree structure using multiple root bridges according to the first embodiment of the invention.

FIG. 6 is a diagram illustrating an example of multiple transmission trees which is applied to the same network topology as that shown in FIG. 2. When a packet addressed to Station D is transmitted from Station S, the transmission tree extending from root Bridge "b" and depicted by the dashed arrows is employed to transmit the packet to the destination. In this case, the packet transmission route can be greatly shortened, as compared with the conventional arrangement shown in FIG. 2, in which only a single transmission tree uses Bridge "a" as the root. Although FIG. 6 illustrates only two transmission trees with Bridge "a" and Bridge "b" as the corresponding roots for convenience sake, three or more transmission trees may be employed in the wireless network, depending on the network size or other factors, to create transmission trees more extensively.

Next, explanation is made of the above-described two methods for identifying the currently used transmission tree, using the network topology shown in FIG. 6 as an example. The two methods are (1) providing a location table to each of the wireless bridges to record terminal devices in association with wireless bridges under which the terminal devices are currently located, and (2) writing information about the transmission tree in the packet.

Figure 7:
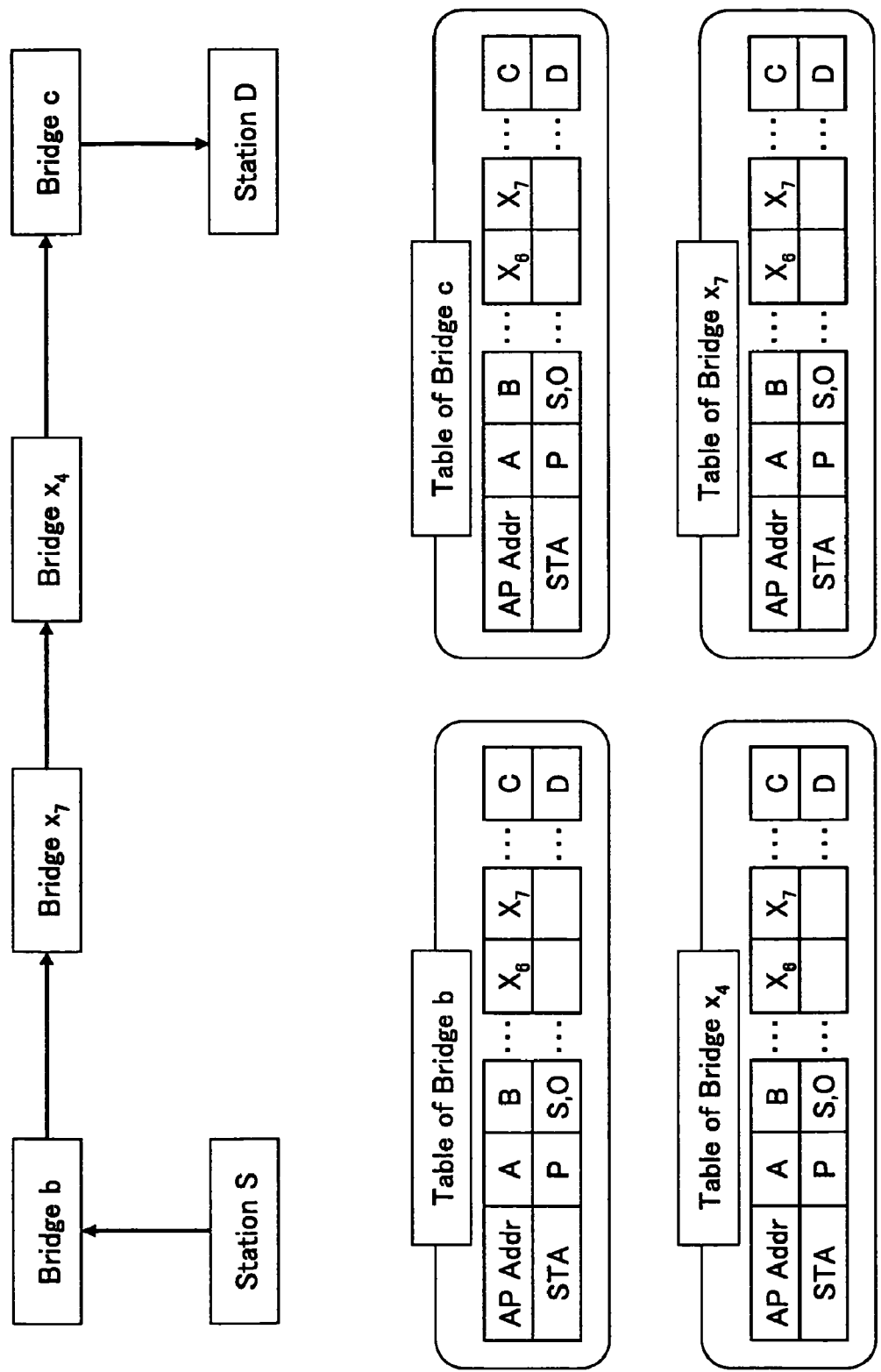
FIG. 7 illustrates an example of the location table set in each of the wireless base stations according to the first embodiment of the invention, which location table is used to identify the appropriate tree for the currently conducted packet transmission among the multiple transmission trees.

FIG. 7 illustrates an example of the location table held in each of the wireless bridges (base stations). The wireless base stations exchange information about the terminal devices currently connected to one of the wireless base stations on the network to create and update the location tables. In the example shown in FIG. 7, each of the location tables held by one of the wireless bridges records the address A of Bridge "a" in association with Station P currently existing under Bridge "a", the address B of Bridge "b" in association with Stations S and O currently existing under Bridge "b", and the address C of Bridge "c" in association with Station D currently existing under Bridge "c". Although not shown in FIG. 7, all the terminal devices (Stations) currently existing under one of the wireless base stations (Bridges) are listed in the location table. With the location table, each of the wireless base stations can determine what device is currently located under which wireless base station.

When a packet is transmitted from Station S to Station D in the network shown in FIG. 6, Station S adds the self address as the source address, adds the address of Station D as the destination address, and adds address B of Bridge "b" as the receiving node address to the address fields of the packet.

Upon receiving the packet from Station S, Bridge "b" transmits the packet to the next node(s) along the transmission tree extending from Bridge "b" itself as the root. Each of the nodes (Bridges) having received the packet checks the address fields of the packet, and determines that the source terminal is Station S. These Bridges also check the location table to determine that Station S currently exists under Bridge "b", select the transmission tree extending from Bridge "b" as the root from the tree table, and transmit the packet to the next node along the selected transmission tree.

For example, Bridge B transmits the packet to Bridges x7, x8, and x9 along the transmission tree indicated by the dashed arrows. Bridge x7 selects the transmission tree extending from Bridge b as the root, based on the location table and the address information of the packet, and transmits the packet to Bridges x4 and x6. Bridge x8 also selects the transmission tree, and determines that the next node does not exist on the selected tree. In this case, Bridge x8 discards the packet. Bridge x9 performs the same process as Bridge x7. In this manner, the packet is finally relayed to Bridge "c", and delivered to Station D located under Bridge "c".

If a transmission tree extending from the bridge of the transmitting side is employed, as in the above-described example, the packet is transmitted to two or more nodes at a branch point. This arrangement may be acceptable for broadcasting a packet without a specific destination. However, when unicasting a packet addressed to a specific destination along the transmission tree extending from the bridge of the transmitting side, the packet is transmitted to bridges irrelevant to the destination. To avoid such inefficiency, the following measures may be employed.

(a) When unicasting a packet toward a specific destination, select a transmission tree extending from the root bridge connected to the destination terminal (Station); and (b) Create a learning table when transmitting a packet, and use the learning table for the second and subsequent packet transmissions.

With measure (a), a packet is transmitted from Station S addressed to Station P in the network shown in FIG. 6, then the transmission tree extending from root Bridge "a" to which Station P currently belongs is selected. Each of the wireless bridges located on the transmission tree identifies this transmission tree extending from root Bridge "a", based on the destination address of the packet and the location table. By selecting the transmission tree extending from the root bridge connected to the correspondent terminal, the packet can be relayed only to the destination, tracing back the tree toward the root. In the example of FIG. 6, Bridge "b" transmits the packet only to Bridge x9, tracing back the transmission tree indicated by the bold arrows, without transmitting the packet to Bridges x7 and x8.

This arrangement can further reduce the network workload. On the other hand, when broadcasting a packet without specific destinations, or when transmitting a packet addressed to a terminal device whose base station is unknown, a transmission tree extending from the root bridge under which the source terminal is located is selected to relay the packet to the destination(s).

A wireless bridge located at the end of the network may not have a transmission tree extending from this wireless bridge itself as the root. For example, Bridge "c" shown in FIG. 6 is a distal bridge that does not currently behave as a root bridge. In this case, each of the wireless bridges first checks the destination address (of Station D in this example), and if there is not a transmission tree extending from the wireless bridge as the root connected to the destination terminal, then another transmission tree extending from the wireless bridge of the transmitting side connected to the source terminal may be selected.

With measure (b), a learning table is used, in addition to the location table. Each of the wireless bridges records the previous node from which the packet generated by the source terminal specified by the source address is currently relayed. For creation of the learning table, any known method may be employed.

Figure 8:
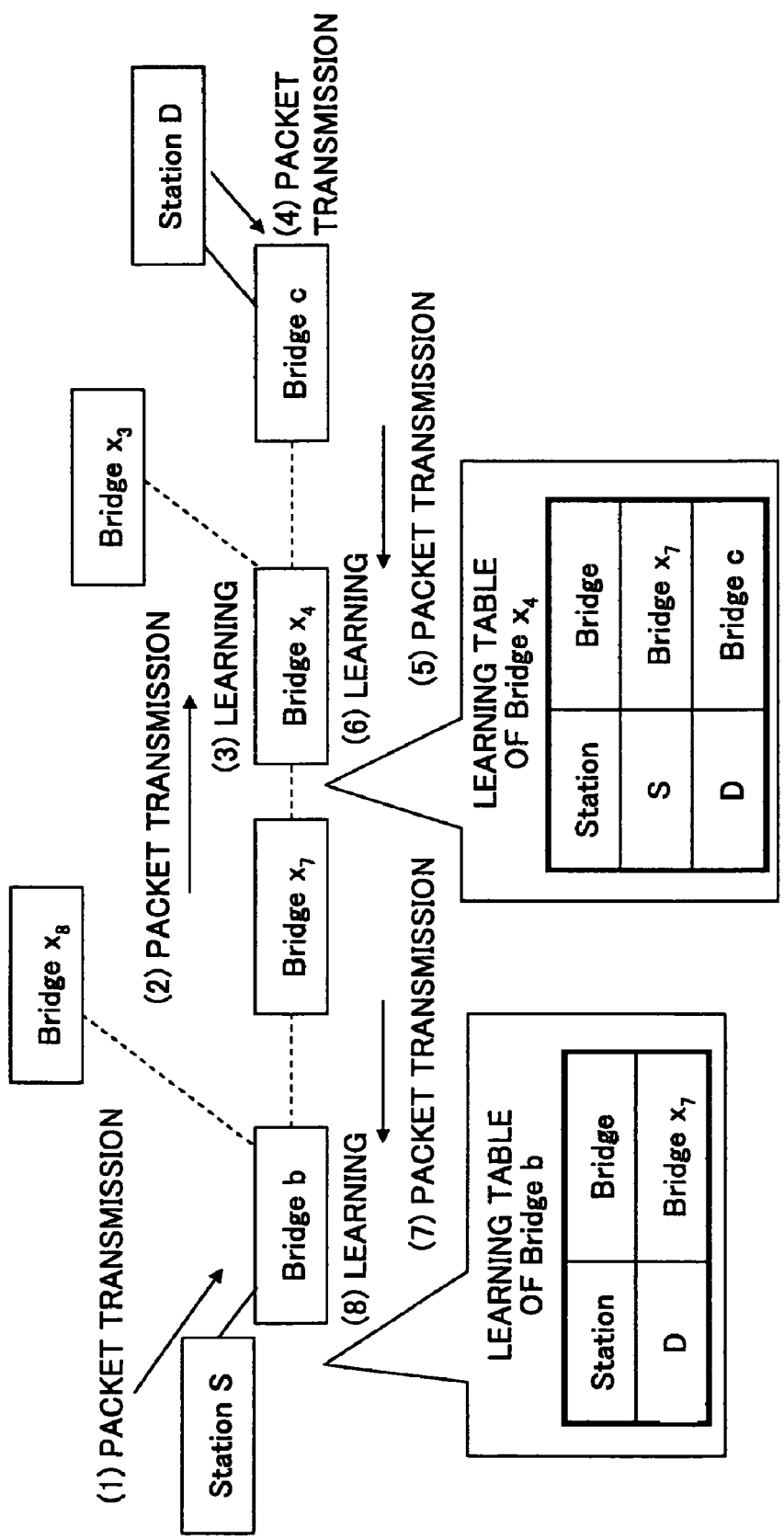
FIG. 8 is a diagram used to explain creation of a learning table at each of the wireless base stations according to the first embodiment of the invention.

FIG. 8 illustrates an example of the learning table. When transmitting a packet addressed to Station D from Station S in the network shown in FIG. 6, the packet is first supplied to Bridge "b" (as indicated by the arrow (1)), and transmitted to Bridge x4 via Bridge x7, along the transmission tree extending from root Bridge "b" (as indicated by the arrow (2)). At Bridge x4, it is determined that the packet is generated at Station S from the source address of the packet, and that the previous node is Bridge x7 from the transmitting address of the packet. Then, Bridge x4 records these information items in the learning table (at step (3)). For example, the address or the ID of the source terminal (Station S) is written in association with the address or the ID of the previous node (Bridge x7). Then, the packet reaches the destination terminal (Station D) via the last Bridge "c".

Station D then sends a reply packet to Station S (as indicated by the arrow (4)). The reply packet is transmitted from Bridge "c" to Bridge "x4" (as indicated by the arrow (5)). Bridge x4 determines that the source terminal is Station D and the reply packet is relayed from Bridge "c", based on the address information contained in the reply packet, and records these information items in the learning table (step (6)), as exemplified in FIG. 8.

The reply packet is further transmitted from Bridge x4 to Bridge "b", via Bridge x7 (as indicated by the arrow (7)). Bridge "b" records the information pair about the source terminal (Station D) and the previous node (Bridge x7) in the learning table (step (8)), and supplies the packet to Station S.

Although not illustrated in FIG. 8, the rest of the bridges (Bridge x7 and Bridge c in this example) along the tree also record the information about the source terminal and the previous node in the learning tables when receiving a packet. When a packet is first received before the learning, Bridge x8 and Bridge x3 located on the branches of the tree also record the information items in the learning table.

When Bridge "b" again receives another packet addressed to Station D, Bridge "b" transmits this packet only to Bridge x7, without transmitting the packet to Bridge x8 or other branches, because Bridge "b" already has information that Station D is located in the direction of Bridge x7. Similarly, when Bridge x4 receives the packet addressed to Station D next time, it transmits the packet only to Bridge "c", without transmitting to other branches. With this arrangement, wasting of packets can be greatly reduced even if a transmission tree extends from the root bridge on the transmitting side.

With method (1) providing a location table to each of the wireless base stations (bridges), when a terminal device is newly connected to one of the wireless base stations, or when a terminal device moves and connects itself to another wireless base station, the wireless base station transmits a message packet reporting the newly connected terminal device along the transmission tree by broadcasting. Upon receiving the message packet, each of the wireless base stations records the newly connected terminal device in the location table. At this time, the wireless base station may be configured to record the source bridge that transmitted the message packet, in association with the previous node, in the learning table.

With this arrangement, the location table and the learning table are simultaneously updated every time a terminal device is newly connected to a wireless base station, and the optimum routing along the transmission tree can be performed more efficiently.

Next, explanation is made of the second method (2) for determining the currently used transmission tree, with reference to FIG. 9. In the second method, information about which transmission tree is used for the current packet is contained in the packet.

Figure 9A:
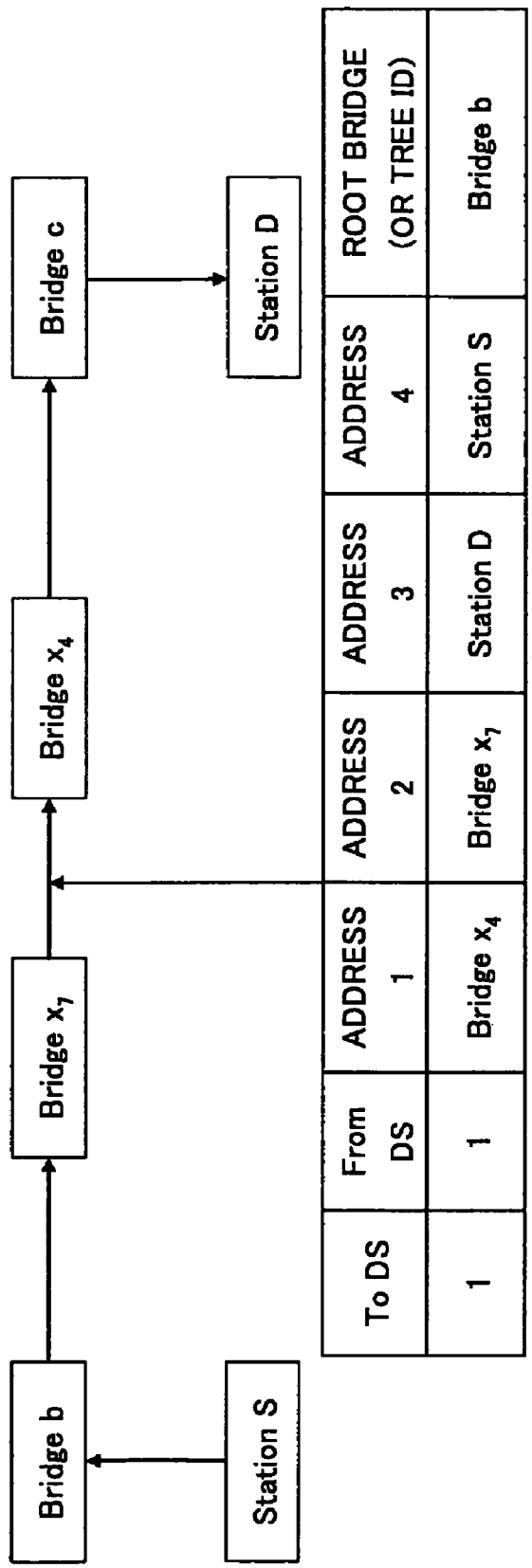
FIG. 9A and FIG. 9B illustrate examples of the format of a packet header having an additional field for storing the tree ID information or the root bridge address information in order to identify the currently used transmission tree.
Figure 9B:
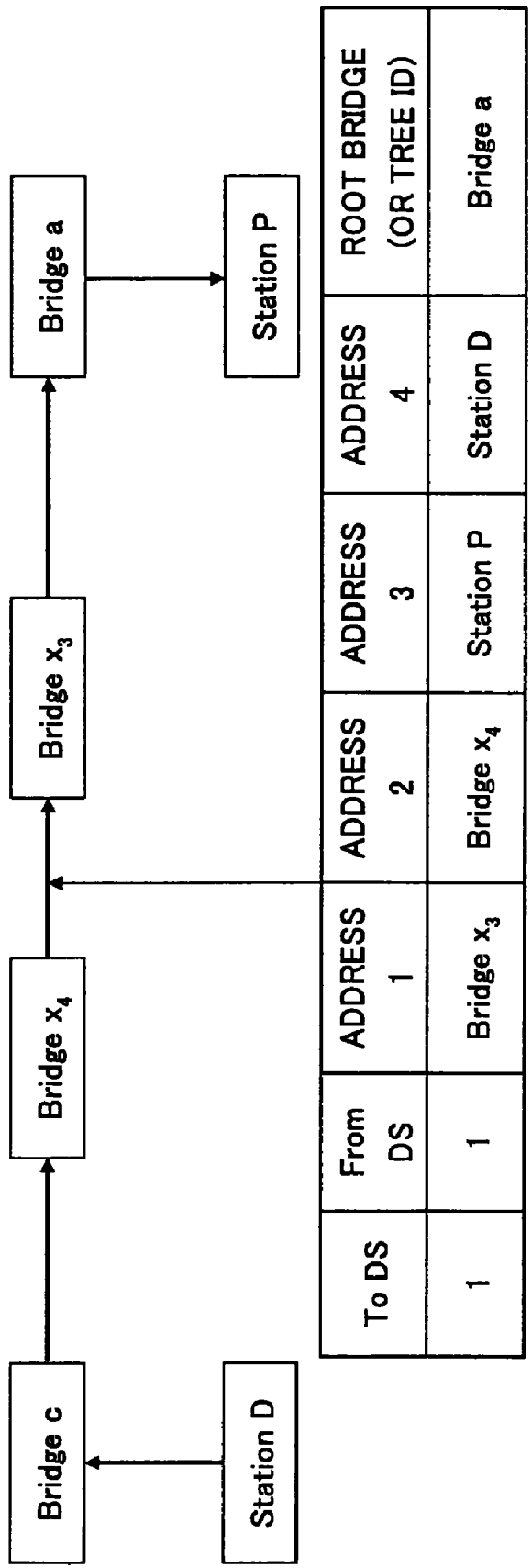

FIG. 9A illustrates an example of the packet format when using a transmission tree extending from the root bridge on the transmitting side, and FIG. 9B illustrates an example of the packet format when using a transmission tree extending from the root bridge on the destination side. The packet format shown in FIG. 9A is used when the second method is used solely, and the packet format shown in FIG. 9B is advantageous when the second method is combined with the first method (using a location table).

It is assumed that a packet is transmitted from Station S located under Bridge "b" to Station D located under Bridge "c" in the network shown in FIG. 6. Unlike the first method, each of the wireless base stations (bridges) on the network cannot know which terminal devices are currently located under which bridges. To make up for this inconvenience, information about the currently used transmission tree or the address of the root bridge is inserted in the packet on the transmitting side. Each of the wireless base stations (Bridges) receiving the packet determines the transmission tree from the information contained in the packet, and transmits the packet to the next node.

In the example shown in FIG. 9A, Bridge "b" that first receives the packet from Station S designates the transmission tree extending from Bridge "b" functioning as the root. Bridge "b" adds the self address as the root information in the extra field of the packet, or alternatively, adds the ID information of the transmission tree. The transmission tree or the root bridge may be designated by Station S when generating and transmitting the packet. In this case, Station S adds the address information of Bridge "b", to which Station S currently belongs, in the extra field of the packet.

Bridge x7 located on the transmission tree receives the packet from the root bridge, and checks the extra field of the packet to determine that the packet is being transmitted along the transmission tree extending from root Bridge "b". Bridge x7 adds the address of the next node, which is Bridge X4 in this example, as the receiving node address in the address field 1 of the packet, and adds the self address as the transmitting address in the address field 2.

If a wireless base station (bridge) is located at a branch of the transmission tree, the packet is to be transmitted to all the branched paths if only the tree information or the root bridge information contained in the packet is used. To avoid this inefficiency, it is preferable for the second method to use a learning table shown in FIG. 8, together with the information contained in the packet. In this case, the source terminal indicated by the source address and the previous node indicated by the transmitting address are paired and recorded in the learning table. Since it is common in wireless communication to receive acknowledge or replay data from the destination, a packet addressed to the same destination can be transmitted in the exact direction to which the target terminal device (destination) is located, without multicasting from the branch, at the second and subsequent transmissions.

In the example shown in FIG. 9B, the address of the last bridge under which the destination terminal is currently located is written as the root bridge information in the extra field of the packet. To realize this arrangement, each of the wireless base stations has a location table. When a wireless base station (referred to as the first bridge) receives a packet from a terminal device, the first bridge identifies the last bridge, to which the destination terminal currently belongs, using the location table. Then, the first bridge adds the address of the last bridge or the ID information of the transmission tree extending from the last bridge (root bridge) to the extra field of the packet, and transmits the packet to the next node along the route tracing back the designated transmission tree. The next and the subsequent node (bridge) can further transmit the packet toward the destination, with reference to the tree table and the address information contained in the packet, without checking the location table.

Figure 11:
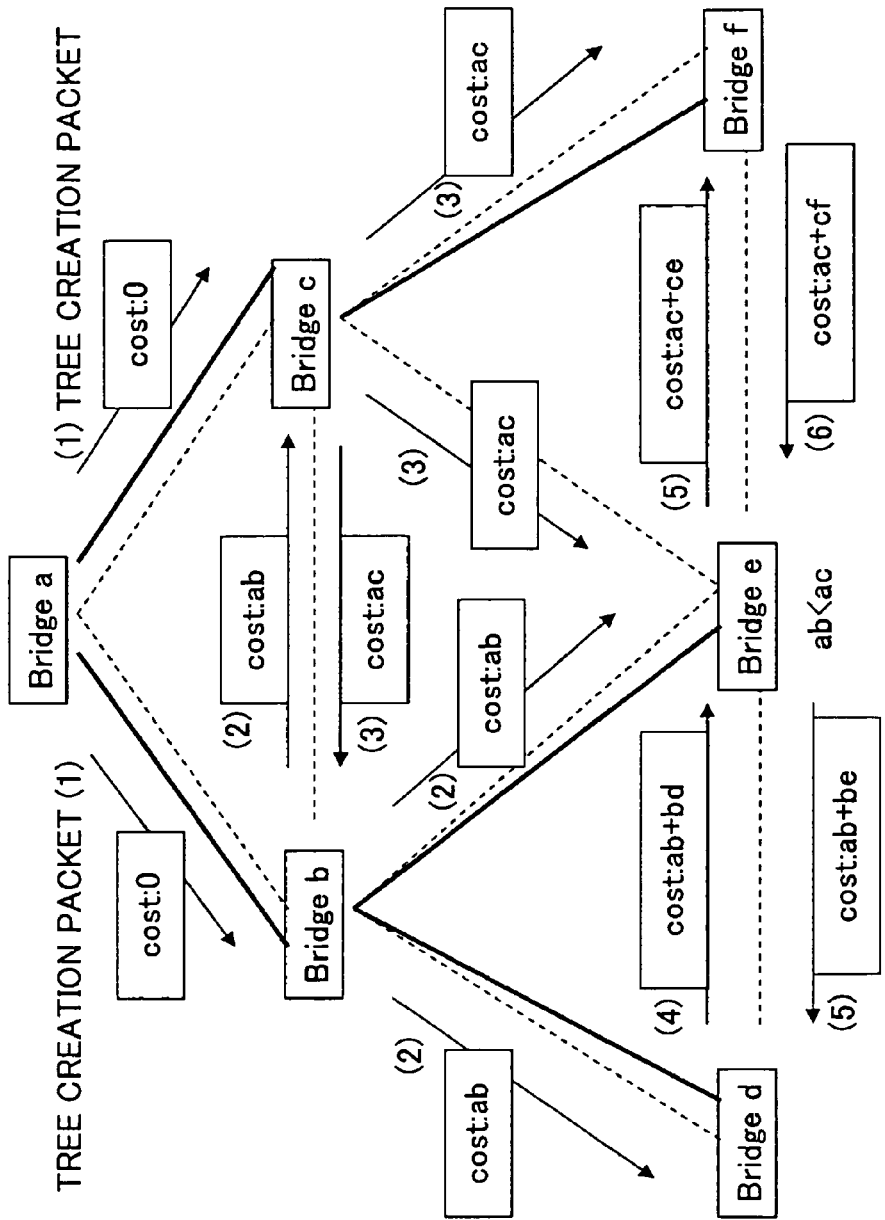
FIG. 11 is a diagram used to explain how the transmission tree is created.

Next, explanation is made of creation of a transmission tree in conjunction with FIG. 10 and FIG. 11. In the first embodiment, the transmission tree is created based on cost estimation taking the wireless environment into account.

FIG. 10A is an example of the cost table used to create a transmission tree in this embodiment, and FIG. 10B is the link cost scheme defined in the IEEE 802.1t. Conventionally, a transmission tree is created in a wired network, based on the number of hops or a fixed transmission rate, as shown in FIG. 10B. However, in a wireless packet transmission network, the transmission rate may vary because the modulation scheme is adjusted according to the conditions of the wireless channel, and because packet errors occur more often than in the wired network. Unlike the conventional wired bridges with little cross talk, the link cost for wireless communication cannot be determined based only on the number of hops.

Under these circumstances, in the first embodiment, the link cost is adjusted according to the conditions of the wireless channel between wireless interfaces or the network traffic when creating a transmission tree.

For example, the signal power level received from the adjacent bridge and/or the error rate are reflected in the cost estimation. In the cost table shown in FIG. 10A, the column of "Bridge" represents the nearby bridge ID located near the target bridge, the column of "Signal" represents the signal power level received from the nearby bridge, the column "Queue size" represents the transmit queue size added to the message packet transmitted when creating a transmission tree, and the column "Error Rate" represents the packet receipt error rate. Based on the power level of the message packet received at the target bridge, the modulation scheme used on the link between the interfaces may be determined, and the transmission rate may be further determined from the modulation scheme.

Using these parameters, the cost between the target bridge and the adjacent (nearby) bridge is estimated by the following equation, using normalization factors $\alpha$, $\beta$, and $\gamma$.

$$Cost=\alpha^*(Signal)+\beta^*(Queue\ size)+\gamma^*(Error\ Rate)$$

FIG. 11 illustrates how a transmission tree is created, taking the link cost into account. The dashed lines in the figure denote links between adjacent bridges that can physically communicate with each other. For example, when Bridge "a" behaves as a root bridge to create a transmission tree, it transmits a tree creation packet to adjacent bridges (as indicated by the arrows (1)). The tree creation packet has a field in which a link cost is to be written. The tree creation packet first transmitted from Bridge "a" has cost zero.

Upon receiving the tree creation packet, Bridge "b" calculate a link cost "ab" between Bridge "a" and Bridge "b", based on the cost table shown in FIG. 10A, adds the estimated cost "ab" to the cost field of the tree creation packet, and transmits the packet to adjacent bridges (as indicated by the arrows (2)).

Similarly, Bridge "c", which has received the tree creation packet from Bridge "a", calculates a link cost "ac" between Bridge "a" and Bridge "c", adds the calculated cost "ac" to the cost field of the packet, and transmits the packet to adjacent nodes (as indicated by the arrows (3)).

When Bridge "c" receives the tree creation packet from Bridge "b", Bridge "c" compares cost "ac", which is the link cost between Bridge "c" and the root Bridge "a", and cost "ab+bc", which is the link cost calculated from the tree creation packet from Bridge "b", and discards the link with a higher cost. For example, if ac<ab+bc, then the path extending from Bridge "a" via Bridge "b" to Bridge "c" is not employed. By repeating this process at Bridge "d" (the arrow (4)), Bridge "e" (the arrows (5)), and Bridge "f" (the arrow (6)), a non-loop tree indicated by the solid line in FIG. 11 is created.

The transmission tree can be created or updated at prescribed time intervals, or whenever a wireless terminal device with a bridge function participates in the network to behave as a bridge. The information about the newly created or updated transmission tree is supplied to the wireless base stations (bridges) on the network, and each of the base stations updates the tree table. By reflecting the wireless channel conditions in the link cost, a transmission tree can be created adaptively in agreement with the actual traffic or the network topology.

Figure 12A:
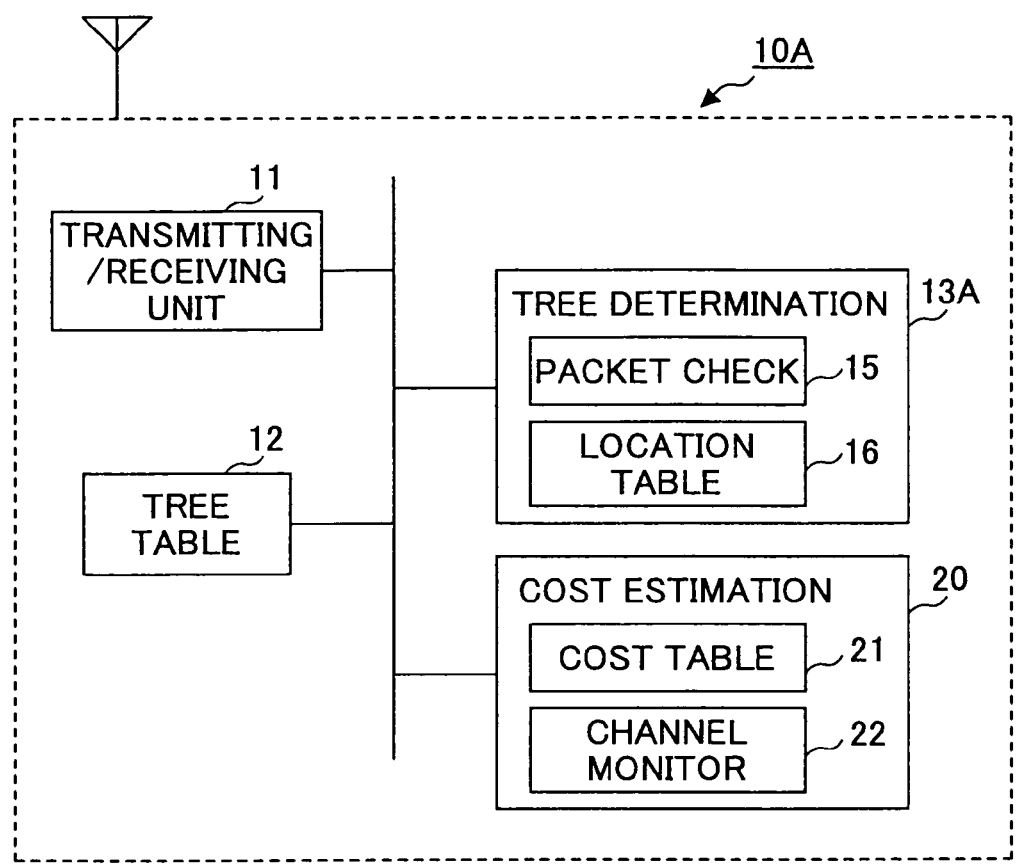
FIG. 12A and FIG. 12B are block diagrams of wireless base stations according to the first embodiment of the invention.
Figure 12B:
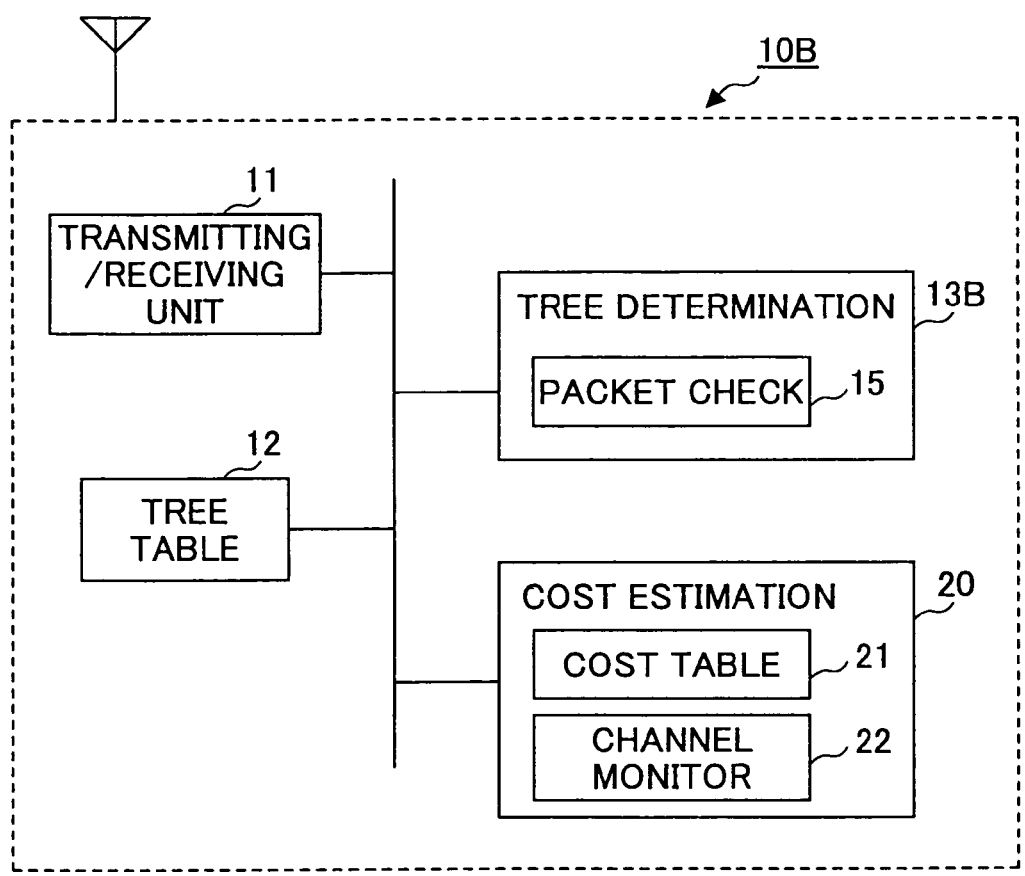

FIG. 12A and FIG. 12B are schematic block diagrams illustrating wireless base stations 10A and 10B, respectively, according to the first embodiment of the invention. The structure shown in FIG. 12A is employed when the location table is used, and the structure shown in FIG. 12B is employed when the tree ID information or the root bridge information contained in the packet is used. Each of the wireless base stations 10A and 10B has a tree table 12 in which information about two or more transmission trees is recorded in association with the root bridges of the trees, and a transmitting and receiving unit 11. The transmitting and receiving unit 11 transmits a packet to the next node according to the determined transmission tree, with reference to the tree table 12. The wireless base stations 10A and 10B also have tree determination units 13A and 13B, respectively.

In the structure shown in FIG. 12A, the tree determination unit 13A includes a packet checking unit 15 and a location table 16. Based on the source address or the destination address contained in the packet and identified by the packet checking unit 15, as well as on the location table 16, the tree determination unit 13A determines a root bridge, and selects a transmission tree referring to the location table 16. The transmitting and receiving unit 11 transmits a packet to the next node by following the tree in the forward or backward direction.

In the structure shown in FIG. 12B, the tree determination unit 13B includes a packet checking unit 15, which extracts the transmission tree ID from the packet to determine the transmission tree to be used.

Each of the wireless base stations 10A and 10B also has a cost estimation unit 20. The cost estimation unit 20 includes a cost table 21 and a channel monitoring unit 22. The channel monitoring unit 22 monitors the channel conditions and updates the parameters (cost values) recorded in the cost table 21. When the transmitting and receiving unit 11 receives a tree creation packet, the cost estimation unit 20 adds the cost from the previous node to the wireless base station 10A (or 10B) to the tree creation packet, consulting the cost table 21. The transmitting and receiving unit 11 then transmits the tree creation packet to adjacent nodes. If the wireless base station 10A (or 10B) becomes a root bridge, the transmitting and receiving unit 11 generates and transmits a tree creation packet with cost zero.

Although only a single interface and a single transmitting and receiving unit 11 are depicted in each FIG. 12A and FIG. 12B for simplification, a backbone interface used for transmission between wireless bridges and an access interface used for communication with terminal devices (Stations) located under the wireless base station 10A (or 10B) may be provided separately.

The first embodiment has been described based on the example of a complete wireless network. However, a portion of the network may be wired. For example, a terminal device may be connected to one of the wireless base stations by a cable. A mobile terminal with a bridge function may be incorporated as a wireless base station in the network. When such a mobile terminal participates in the network, a transmission tree is created dynamically and adaptively, reflecting the current wireless channel conditions. Using two or more transmission trees, route optimization and load distribution can be performed more efficiently.

Although the first embodiment has been explained using the wireless LAN based on the IEEE 802.11 standard, the invention is not limited to this example and is applicable to a wireless network of a WCDMA scheme or the next generation wireless communication scheme. In addition, by adding an interface and a protocol converting function to each of the wireless base stations, the first embodiment can be applied to a wireless packet network in which network segments with different communication schemes coexist.

A portion or all of the transmission trees may be put together to reduce the workload required for maintaining multiple transmission trees. In this case, information about the combined trees is added to the extra field of the packet and/or the tree table.

Figure 13:
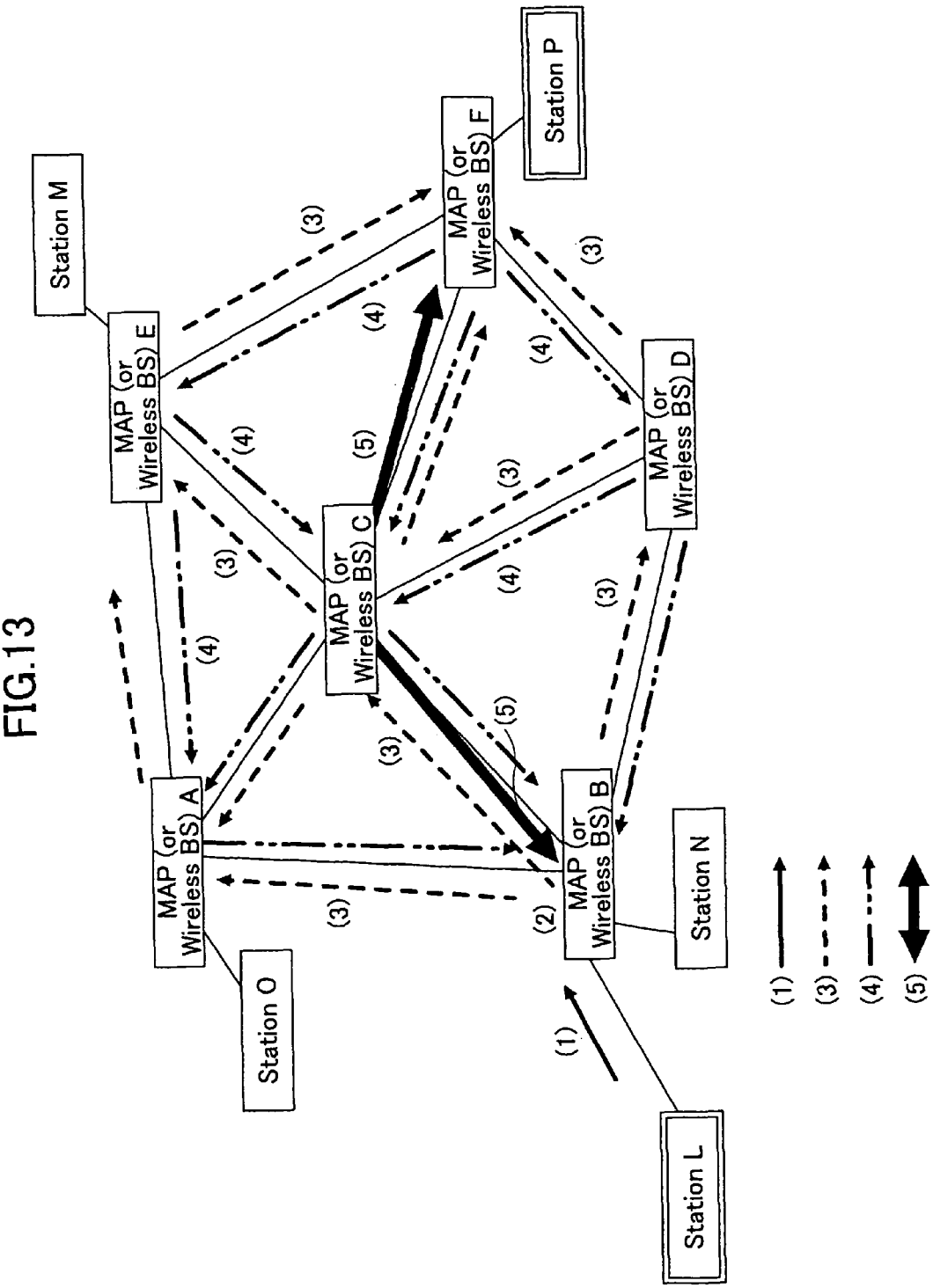
FIG. 13 is a schematic diagram for explaining a packet transmission system according to the second embodiment of the invention.

Next, explanation is made of a packet transmission system according to the second embodiment of the invention in conjunction with FIG. 13. In the second embodiment, optimized link state routing (OLSR) discussed as a route control scheme for mobile ad hoc networks (MANET) (see the non-patent publication 1 listed above) is employed in a mesh network consisting of wireless base stations (mesh access points: MAPs) and terminal devices (stations) in order to optimize packet transmission.

FIG. 13 is a schematic diagram used to explain the outline of a packet transmission system of the second embodiment. In the second embodiment, an existing ad hoc network protocol can be applied to the system, without adding extra functions to the terminal devices (non-mesh stations), regardless of the presence or absence of a transmission tree extending from a specific root bridge, or regardless of the number of transmission trees.

In the following, description is made based on an example of the IEEE 802.11 wireless LAN.

In FIG. 13, a terminal device (station) L belonging to wireless base station (MAP) B at a certain point of time is transmitting a packet addressed to terminal device (station) P to the MAP B (as indicated by the arrow (1)).

Upon receiving the packet from the station L, the MAP B searches in the location table to determine whether the station P is entered in the table (step (2)). The location table is, for example, one illustrated in FIG. 7, in which table each of the mesh access points in the network is recorded and associated with corresponding stations if there are any.

If station P is recorded in the location table, and if the entry is valid (for example, if the valid period has not been expired yet), it is determined from the table that the station P is currently located under MAP F.

If there is no valid entry for station P in the location table, the MAP B broadcasts a query message asking under which mesh access point the station P is currently located (as indicated by the arrow (3)).

Upon receiving the query message, each of the mesh access points searches in the location table. Any mesh access point that finds the entry of station P in the table creates and broadcasts a reply message representing the matching between the station P and MAP F (as indicated by the arrow (4)).

This reply message also reaches the other mesh access points that do not have the entry of station P in the location tables and is entered in their table as a result of the broadcast of the reply message. To prevent occurrence of a loop due to repeated transmission of the same message among mesh access points, sequential numbers are added to the query message and the reply message. Each of the mesh access points records the sequential number of the transmitted message together with the source address of the message so as not to transmit the message with the same number and the same source address twice.

At least MAP F knows that station P is owned by this access point. Because the location table of MAP F has an entry of station P, the MAP F replies to the query message. As long as the packet transmitted from the station L is addressed to another terminal device (station) existing in the network, a reply message in response to the query message is transmitted without fail.

Upon receiving the reply message, MAP B updates the location table by adding the entry of station P. In this manner, even if there is no entry of the destination station P in the location table of MAP B at receipt of the packet, MAP B transmits a query message and can add the entry of station P in association with the current owner MAP F in the location table.

Based on the updated location table, MAP B determines that the packet is to be forwarded to MAP F in order to deliver the packet to the destination station P. Upon the determination, MAP B transits the packet to the next hop, which is MAP C in this example, according to the route control table created among the mesh access points A-F through autonomous routing control in the network using a typical OLSR protocol.

Each of the access points located on the packet transmission route determines that the destination station P is currently located under MAP F from its location table and forwards the packet to the next hop according to the route control table, and the packet is finally transmitted to MAP F.

If there is not an entry of destination station P in the location table of a certain access point on the route, that access point (MAP) also broadcasts a query message as described above.

Upon receipt of the packet, MAP F transmits the packet to the station P, and packet transmission from station L to station P has been completed.

The non-mesh station L currently located under MAP B can communicate with station P located under MAP F, without performing route control by itself.

To reduce time taken from transmission of a query message to receipt of a reply message, a message representing participation of a new station may be broadcast in the network whenever a station is newly located under any one of the mesh access points.

Figures 14A, 14B:
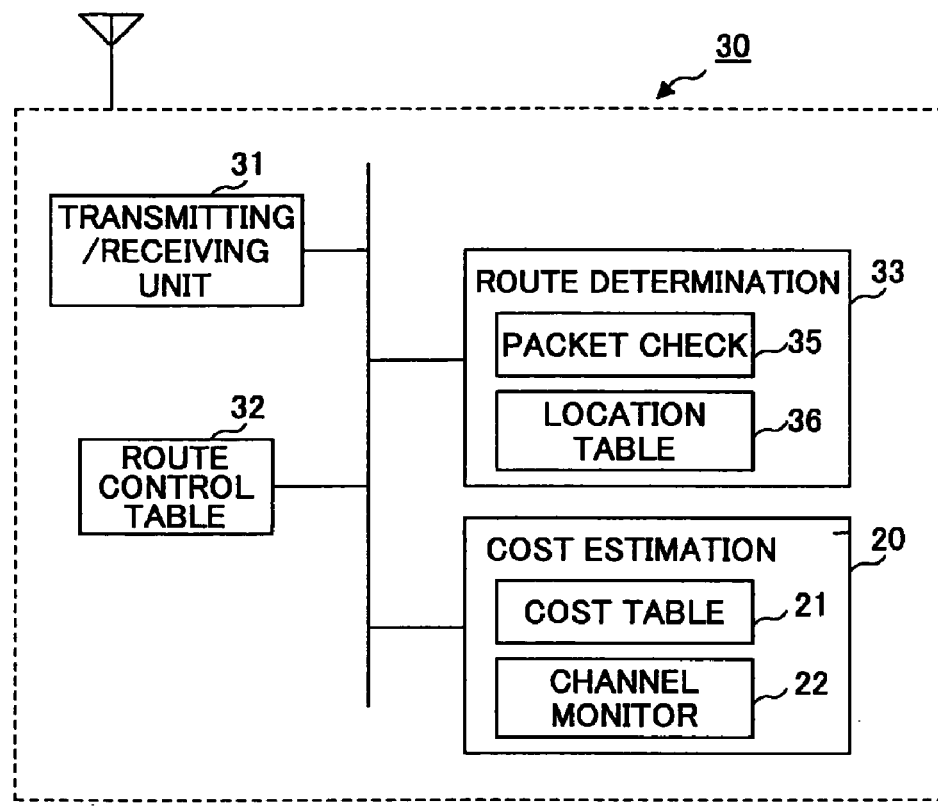
FIG. 14A is a block diagram of a wireless base station according to the second embodiment.
FIG. 14B is an example of a route control table used in the wireless base station of the second embodiment.

FIG. 14A is a block diagram of the wireless base station 30 according to the second embodiment of the invention. The wireless base station 30 includes a transmitting/receiving unit 31, a route control table 32, a route determination unit 33, a packet checking unit 35, and a location table 36. The wireless base station 30 may optionally has a cost estimation unit 20 that includes cost table 21 and a channel monitoring unit 22.

The transmitting/receiving unit 31 transmits and receives packets addressed to certain destinations, query messages, and reply messages. The packet checking unit 35 checks the source address and/or the destination address contained in each packet. The location table 36 is, for example, one illustrated in FIG. 7.

FIG. 14B illustrates an example of the route control table 32. This table describes the destination wireless base stations under which the destination stations are located, in association with the next hop. The route control table of FIG. 14A is held by MAP B in the network shown in FIG. 13. The next hop may be associated with the source wireless base station, in place of the destination wireless base station. In this case, upon receiving a packet from any one of the source wireless base station, the MAP B forwards the packet to the corresponding base station (next hop) described in the table.

The route determination unit 33 searches in the location table 36 based on the source address or the destination address determined by the packet checking unit 35 to determine the wireless base station under which the source station or the destination station is currently located. Then the route determination unit 33 determines to which node the packet is to be forwarded based on the route control table 32 and transmits the packet to the next hop.

In the second embodiment, it is unnecessary to install an autonomous routing control function, such as an OLSR protocol, in conventional non-mesh devices or less sophisticated devices. Because the wireless base station proxies a terminal device for route control, arbitrary terminal devices can communicate with each other using the dynamically selected optimum route between network segments. The wireless base stations exchange table information representing connection between a wireless base station and a terminal device owned by this wireless base station and manage the table information by themselves, and therefore, it is unnecessary to establish a specific location management node. As a result, load concentration on the location management node and network disconnection due to failure of the location management node can be avoided.

Although OLSR is employed as the route control protocol in the second embodiment, the method described in the second embodiment can be applied to other route control protocols, such as dynamic source routing (DSR), ad hoc on demand vector (AODV), topology broadcast reverse path forwarding (TBRPF), or open shortest path first (OSPF).

Although the IEEE 802.11 wireless LAN is exemplified, the above-described technique is applicable to other wireless networks of, for example, WCDMA or the next generation wireless communication schemes. By furnishing each of the wireless base stations with an interface and a protocol converting function, the method of this embodiment can be applied to a wireless packet network in which two or more networks of different communication schemes coexist.

The wireless basestaion 30 may dynamically produce a transmission tree based on a link cost according to the method described in the first embodiment, in place of or in addition to the above-described route control protocol. In this case, the tree table illustrated in FIG. 4 may be used in place of or in addition to the route control table 32. If the transmission tree is used together with the route control protocol, the tree determination method described in the first embodiment can be used.

In the packet transmission system of the second embodiment, ID information representing the packet transmission route determined by a route control protocol may be contained in the packet. The address information of the wireless base station under which the source station or the destination station is currently located may also be contained in the packet. In the latter case, the source wireless base station that first receives a packet from the source station writes its address or the address of the destination wireless base station under which the destination station is located into the packet. With this structure, the wireless base stations along the transmission route do not have to search in the location table, and instead, simply determine the next hop from the route control table and forward the packet to the next hop.

FIG. 15 through FIG. 23 illustrate route optimization performed in a wireless network according to the third embodiment of the invention. In the third embodiment, the packet size or length (more particularly, the payload size or length) is considered, in addition to the transmission rate or other radio channel conditions, when estimating a link cost.

Figure 15:
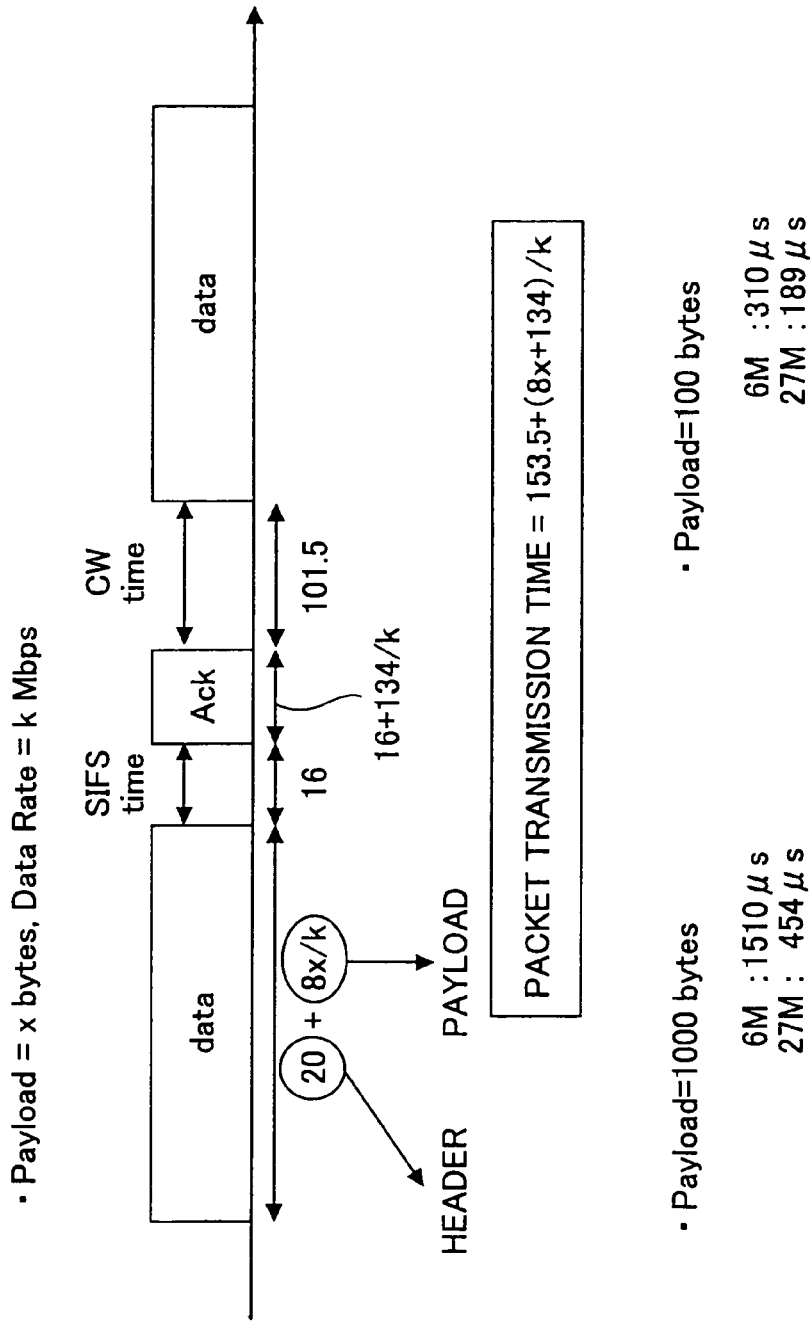
FIG. 15 is a diagram used to explain the packet transmission route optimizing method according to the third embodiment of the invention.

FIG. 15 is a schematic diagram illustrating an example of a frame transmission scheme based on the IEEE 802.11a standard. In many wireless communications systems, a packet has a header of a fixed length and a payload of a variable length. Negotiation time required for packet transmission and header transmission time become overhead with respect to actual data transmission. The amount of overhead varies depending on the transmission rate and the payload size. Less overhead is more preferable for packet transmission.

In the example shown in FIG. 15, every time a data frame has been transmitted, an acknowledgement (Ack) is received after a short interval called a short interframe spacing (SIFS). Then, after a contention window (CW) for selecting a backoff time, the next data frame is transmitted. Assuming that the payload is x bytes and the date rate is k Mbps, then header transmission time for a packet is about 20 µs, payload transmission time is about 8x/k µs, SIFS is about 16 µs, Ack transmission time is about (16+134/k) µs, and the CW period is 101.5 µs. Consequently, time required for one-frame transmission is about $$[(20+16+16+101.5)+(8x+134)/k]\mu s.$$

The value k MB expressing data transmission rate varies depending on the modulation scheme and/or the coding rate employed according to the radio wave environment between wireless base stations (or access points). For example, with high-intensity radio waves, a higher bit rate is employed, and with lower intensity, a lower bit rate is employed. In the example of FIG. 15, the transmission rate is selected from 6 Mbps and 27 Mbps, depending on the radio environment, for simplification purposes. In the actual transmission three or more transmission rates can be set.

If the payload of a packet is 1000 bytes (x=1000), time required for packet transmission in the 6 MBPS mode is about 1510 μs, according to the above-described formula. In the 27 Mbps mode, it become about 454 μs.

If the payload of a packet is 100 bytes (x=100), then 6 Mbps mode packet transmission time becomes 310 μs, and 27 Mbps mode packet transmission time becomes 189 μs.

Figure 16:
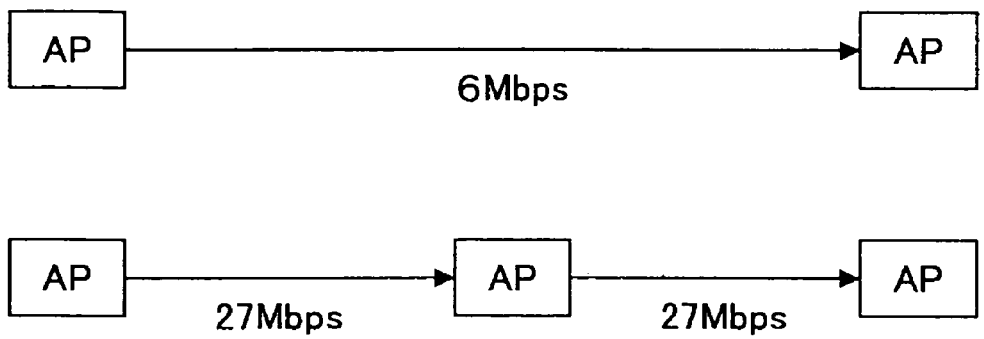
FIG. 16 is a diagram used to explain the relationship between the payload size and the optimum route.

FIG. 16 illustrates the relationship between the payload size and the optimum route. Consideration is made of two cases, transmitting packets at the 6 Mbps data rate with a single hop and transmitting packets at the 27 Mbps data rate with 2 hops.

If 1-hop transmission is performed for 1000 bytes payload on the 6 Mbps channel, the transmission time (required for one frame) is about (1510μs)*(1hop)=1510μs.

This can be converted to data rate of about 5.3 Mbps.

If the 2-hop transmission is performed for the same 1000-byte payload on the 27 Mbps channel, one-frame transmission time becomes (454μs)*(2hops)=908μs, which can be converted to data rate of about 8.6 Mbps.

This means that it is advantageous for a long packet (with a greater payload size) to select a higher bit-rate route even if the number of hops increases.

On the other hand, when 1-hop transmission is performed for a 100-byte payload on the 6 Mbps channel, one frame transmission time becomes about (310μs)*(1hop)=310μs, which is converted to data rate of about 2.6 Mbps. If 2-hop transmission is performed for the same 100-byte payload on the 27 Mbps channel, one-frame transmission time becomes (189μs)*(2hops)=378μs, which is converted to data rate of about 1.9 Mbps.

Since, for a short packet (with a smaller payload size), the overhead ratio needed for header transmission or the like becomes higher, it is advantageous to select a route with fewer hops even if the bit rate is lower.

In this manner, when a wireless network employs adaptive modulation and adaptive coding, the optimum route varies depending on the payload size of the packet to be transmitted. Accordingly, in the third embodiment, each of the wireless base stations in the network is furnished with a packet size determination unit and multiple routing tables corresponding to different packet sizes, to take into account the packet size, in addition to the transmission rate, when creating a transmission table.

Figure 17:
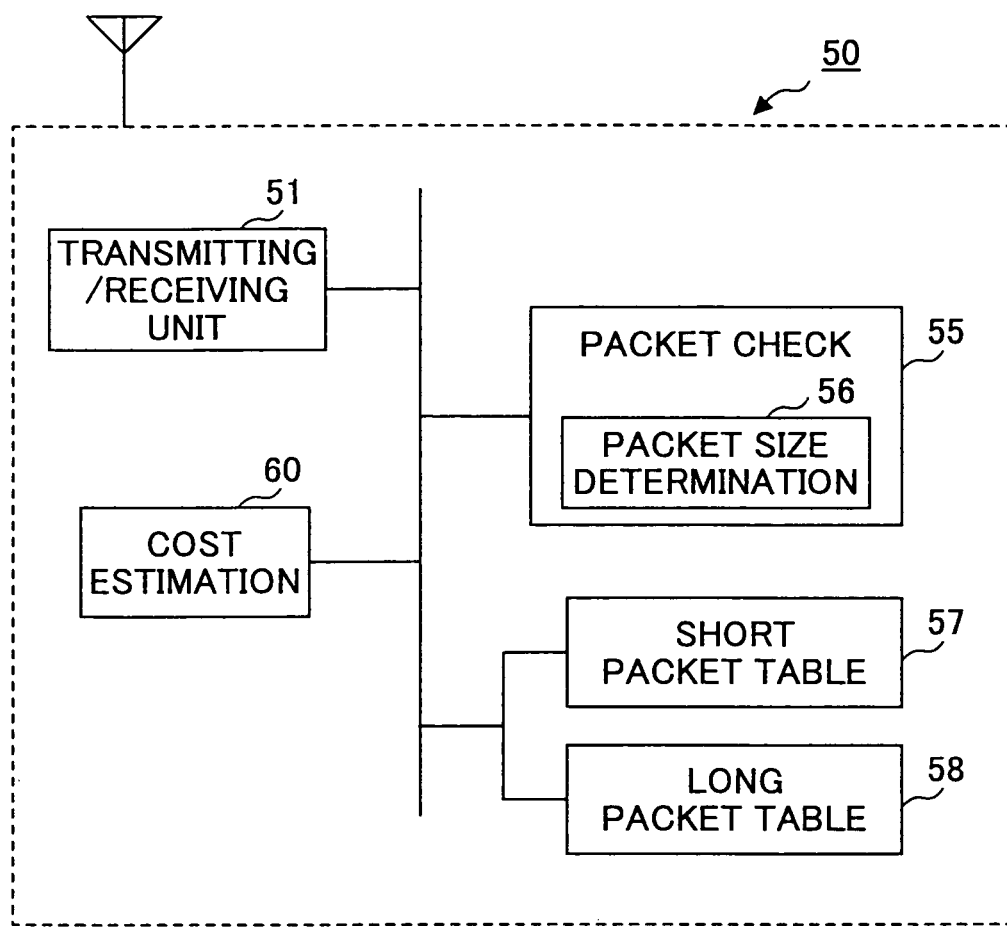
FIG. 17 is another block diagram of a wireless base station according to the third embodiment of the invention.

FIG. 17 is a block diagram of a wireless base station according to the third embodiment of the invention. The wireless base station 50 has a transmitting and receiving unit 51, a packet size determination unit 56 configured to determine the size or length of a packet or the payload, a short packet table 57 used when the packet size is at or below a prescribed reference value and for recording short packet routes in association with destinations, and a long packet table 58 used when the packet size is above the prescribed reference value and for recording long packet routes in association with destinations. The transmitting and receiving unit 51 transmits the packet to the next node, with reference to either the short packet table 57 or the long packet table 58, depending on the packet size determined by the packet size determination unit 56.

Although in FIG. 17 only two routing tables (the short packet table 57 and the long packet table 58) are illustrated, three or more routing tables may be furnished, according to the criteria set for the packet size. In addition, these routing tables are examples or a part of multiple transmission trees used in the packet transmission system.

Upon receiving a link cost request, such as a route search packet or a tree creation packet, the cost estimation unit 60 calculates a link cost between the previous node and the wireless base station 50 itself, taking into account the current transmission rate, for each of the short-packet case and the long-packet case. Then, the cost estimation unit 60 adds the two estimation results to the route search packet or the tree creation packet, and transmits the packet to adjacent wireless base stations. The wireless base station 50 updates the short packet table 57 and the long packet table 58 based on the routes selected from the cost information in the network.

The wireless base station 50 may be either a mobile type or a fixed type, as in the first embodiment.

Figure 18:
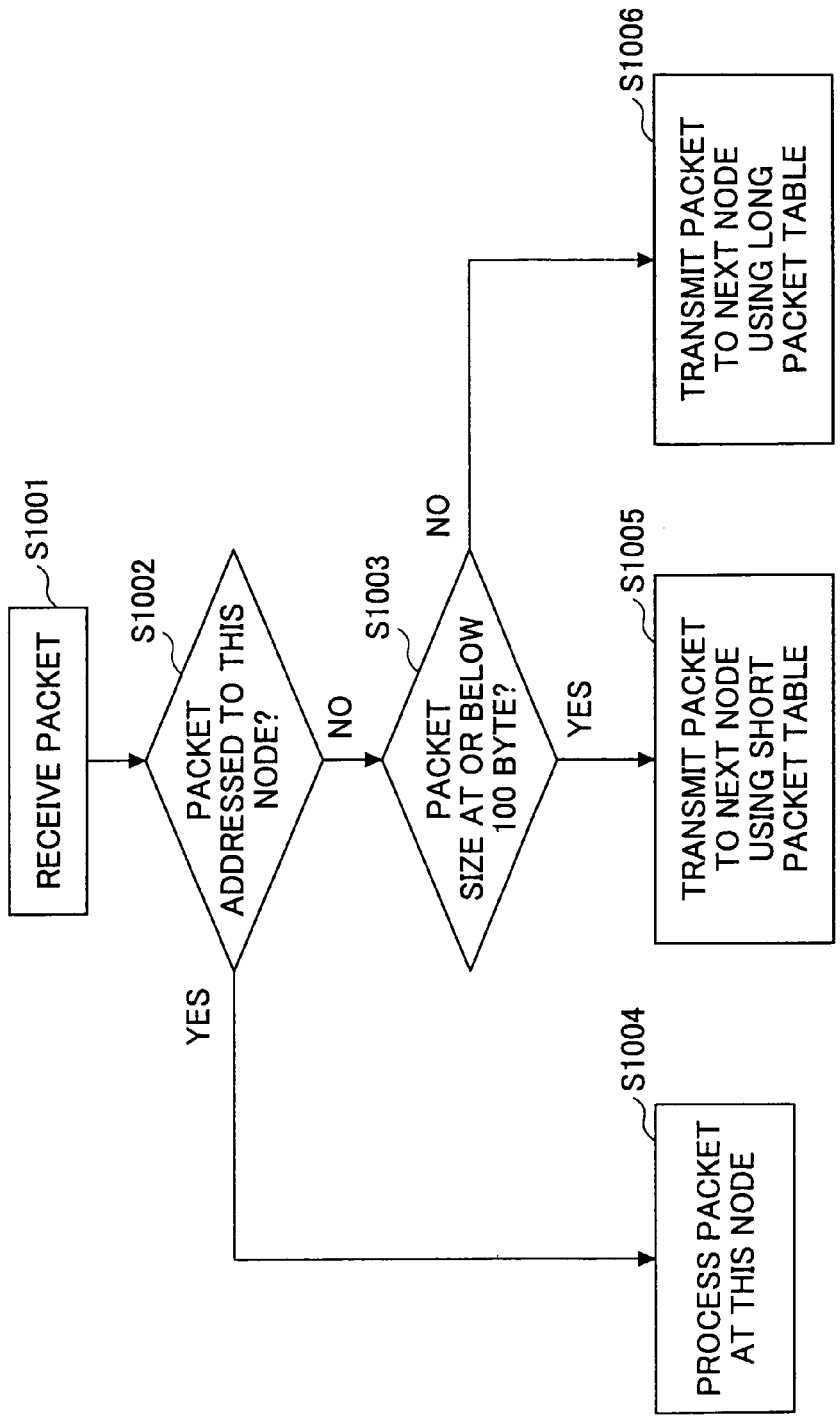
FIG. 18 is a flowchart of the optimum routing method taking the packet size into account according to the third embodiment of the invention.

FIG. 18 is a flowchart showing the operation of the wireless base station 50 according to the third embodiment of the invention. When receiving a packet (S1001), the wireless base station 50 determines, at the packet checking unit 55, whether the packet is addressed to the wireless basestaion 50 itself (S1002). If the packet is addressed to the wireless base station 50 (YES in S1002), the packet is processed at the wireless base station 50 (S1004) because it is unnecessary to transmit the packet to the next node. If the packet is addressed to another node or terminal device (NO in S1002), then the packet size determination unit 56 determines whether the packet size or the payload size is at or below the prescribed reference value, for example, 100 bytes (S1003). If the payload size is less than or equal to the prescribed value (YES in S1003), the wireless base station 50 selects a route recorded in the short packet table 57 in association with the destination, and transmits the packet to the next node (S1005). If the packet size or the payload size exceeds the reference value (NO in S1003), the wireless base station 50 selects a route recorded in the long packet table 58 in association with the destination, and transmits the packet to the next node (S1006).

Figure 19:
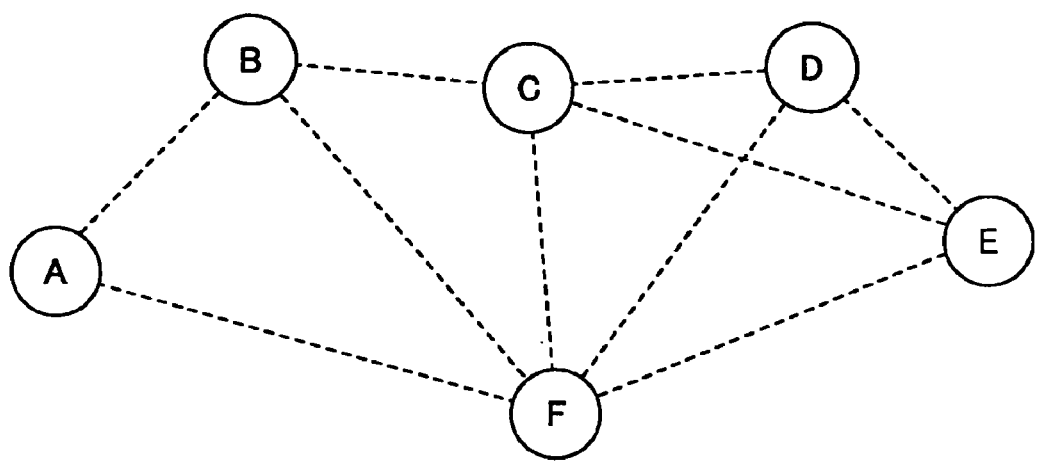
FIG. 19 is a schematic diagram illustrating a network structure to which the optimum routing method of the third embodiment is applied.

FIG. 19 is an example of the network topology to which packet transmission route optimization of the third embodiment is applied. The network includes wireless base stations A-F. The nodes mutually connected by the dashed lines can communicate with each other. The wireless base stations A-F function as wireless bridges to relay packets between nodes or network segments. Although not shown in FIG. 19 one or more terminal devices without bridging functions may be connected to one of the wireless base stations A-F.

Figure 20A:
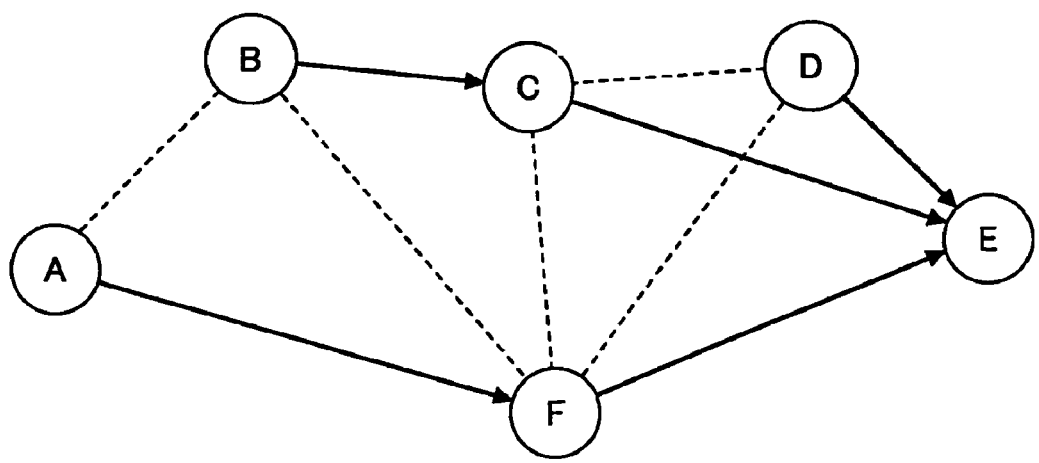
FIG. 20A illustrates an example of the short packet transmission route.

FIG. 20A illustrates an example of a short packet transmission route leading to wireless base station E in the network shown in FIG. 19. Since the overhead rate (due to header transmission or other factors) is high in short packet transmission, a route with fewer hops is advantageous. When transmitting a packet from A to E, a route A→F→E with fewer hops is selected. When transmitting a packet from B to E, a route B→C→E with fewer hops is selected. From wireless base station D, a packet is transmitted directly to E, which is the adjacent node of D.

Figures 20B, 21A:
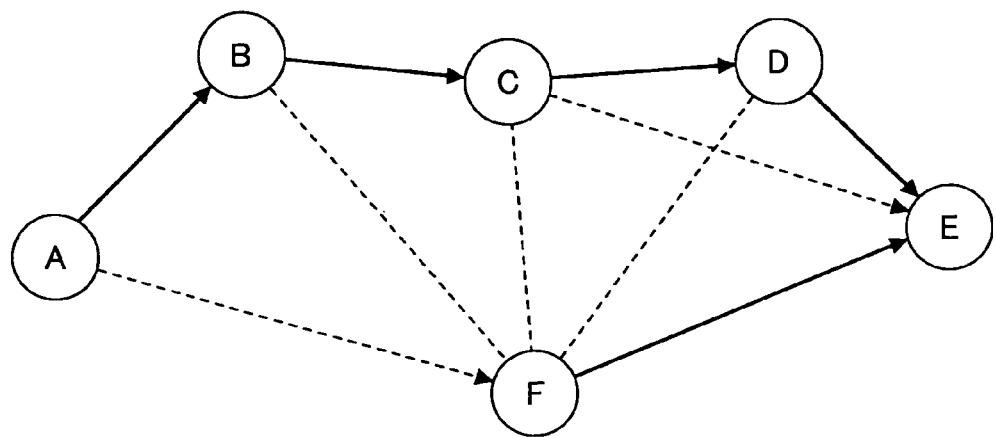
FIG. 20B illustrates an example of the long packet transmission route.
FIG. 21A is an example of the short packet routing table, in which table all the nodes along the route are described.

FIG. 20B illustrates an example of a long packet transmission route leading to wireless base station E in the network shown in FIG. 19. Since the overhead with respect to the data transmission time is smaller in transmission of long packets, a route with a higher transmission bit rate is selected even if the number of hops increases. When transmitting a packet from A to E, a section with a higher bit rate is selected, and the route A→B→C→D→E with the shortest total transmission time is selected. When transmitting a packet from F to E, the route F→E is selected in the example shown in FIG. 20B. However, if the total transmission time through the route F→D→E becomes shorter (that is, if the bit rate of this routes become higher) depending on the radio environment, then, the latter route is selected.

FIG. 21 illustrates an example of the routing table held in wireless base station A. The table shown in FIG. 21A is a short packet table, and the table shown in FIG. 21B is a long packet table. In these tables, a route is recorded in association with a destination node so as to include all the nodes from wireless base station A to the destination node.

Figure 22B:
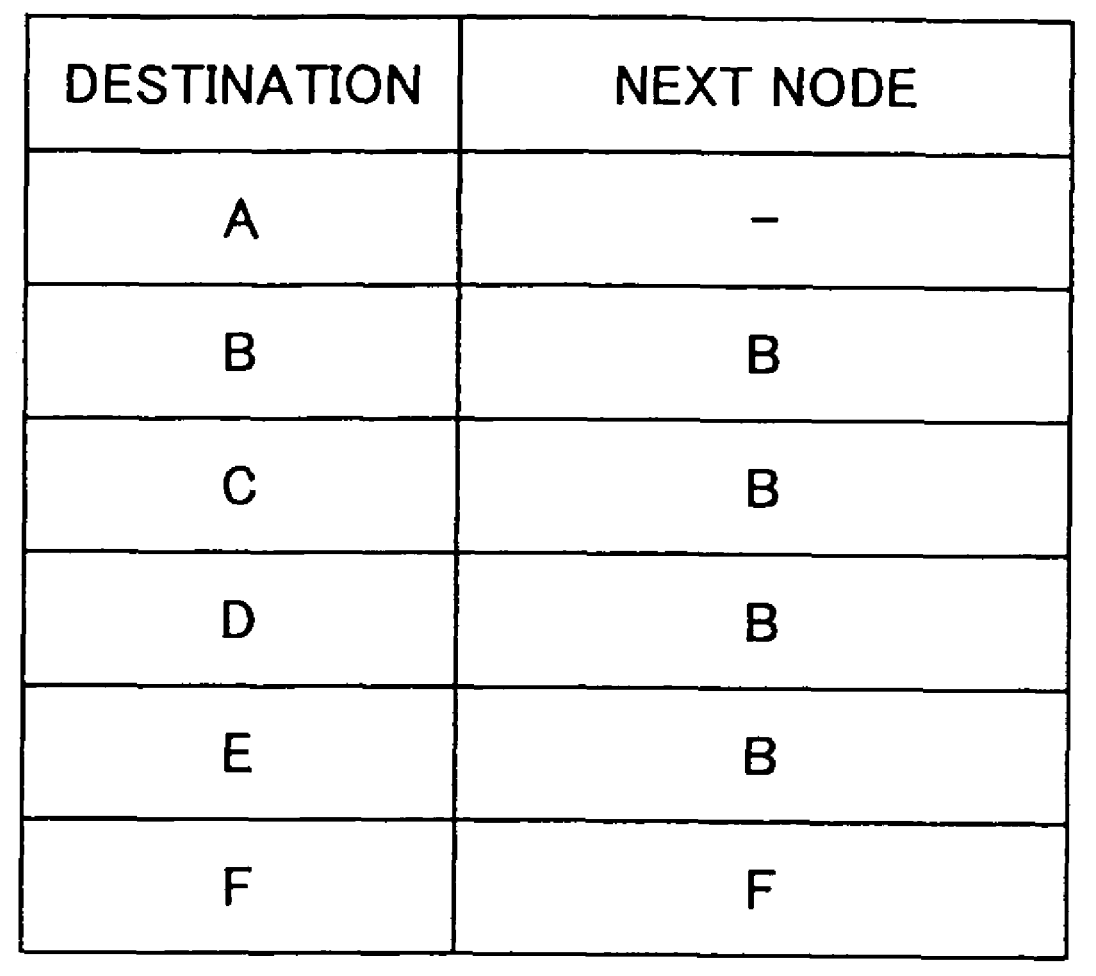

FIG. 22 illustrates another example of the routing table. The table shown in FIG. 22A is a short packet table, and the table shown in FIG. 22B is a long packet table. In these tables, a route is designated by indicating only the next node, which route is recorded in association with a destination node.

Figure 23:
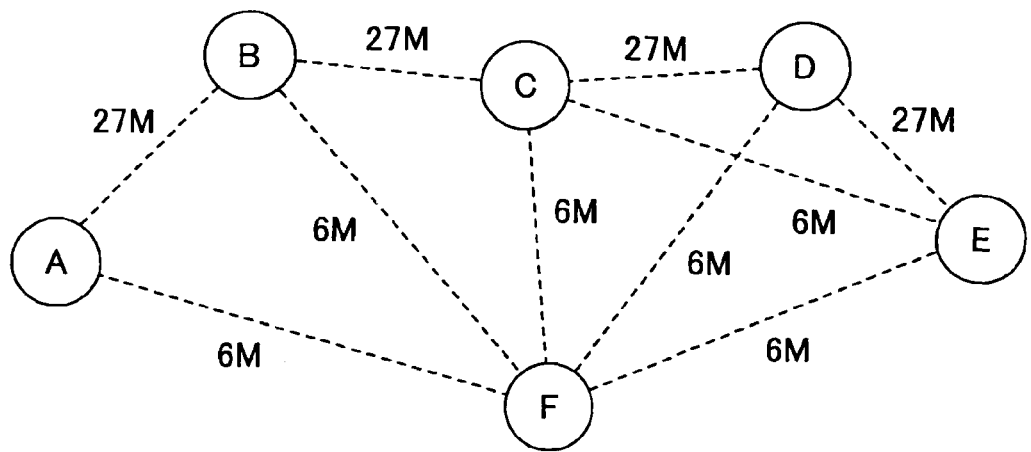
FIG. 23 is a diagram illustrating an example of link cost estimation according to the third embodiment of the invention.

FIG. 23 illustrates an example of link cost estimation for creating or updating the routing tables shown in FIG. 21 and FIG. 22. In this example, a transmission rate of 6 Mbps or 27 Mbps is applied to each of the links between two adjacent nodes, according to the current conditions of the radio channels.

When transmitting a packet from wireless base station A to wireless base station E, the wireless base station A transmits a route search packet to adjacent nodes. Node (wireless base station) F and node B receive the route search packet, and each of these nodes calculates a link cost from the previous node (node A) to this node for each of the short packet case and the long packet case, and adds the calculation results in the packet. At node F, a short packet link cost of 310 μs and a long packet link cost of 1510 μs are estimated based on the current transmission rate between node A and node F. Similarly, at node B, a short packet link cost of 189 μs and a long packet link cost of 454 μs are estimated based on the transmission rate between node A and node B.

Then, node E receives the packet from node F, and calculates a short packet link cost and a long packet link cost for the channel between node F and node E, and adds the calculation results to the A-F link cost. Similarly, node C, which has received the packet from node B, calculates a short packet link cost and a long packet link cost for the channel between node B and node C, and adds the calculation result to the A-B link cost. By successively repeating this process, several candidate routes from node A to node E can be obtained. In this example, the following candidates of Route 1: A→F→E;
Route 2: A→B→C→E; and
Route 3: A→B→C→D→E are obtained.

When the route search packets reach node E, the total link costs of short packet transmission and long packet transmission are obtained for each of the candidate routes. For short packet transmission, cost 1 of Route 1 is 620 μs and the cheapest. Accordingly, Route 1 with the fewest number of hops is selected even if the transmission rate is low. For long packet transmission, cost 3 of Route 3 is 1816 μs and the cheapest. Accordingly, Route 3 with the highest transmission rate is selected even if the number of hops is large.

The routes selected for both short packet transmission and long packet transmission are reported to each of the nodes (wireless base stations) in the network, and the short packet table and the long packet table are updated at each node. When wireless base station A transmits a data packet of short size next time, it checks the short packet table and transmits the packet to the next node E designated in the table. When wireless base station A transmits a long data packet, it transmits the packet to the next node B by consulting the long packet table.

Although, in FIG. 23, link cost is estimated using a route search packet in order to determine the optimum route, this technique may be applied to the first embodiment, in which the network uses two or more transmission trees. In this case, both a short packet link cost and a long packet link cost are added to the tree creation packet transmitted from the root bridge, at each of the bridges. Then, a non-loop transmission tree selected from the final link cost is reported to each of the wireless base stations (bridges). To this end, each of the wireless base stations has a short packet transmission tree table and a long packet transmission tree table.

Although the third embodiment has been described using the example based on the IEEE 802.11a standard, the invention is not limited to this example. The link cost can be estimated according to the above-described techniques in an arbitrary transmission system to determine the optimum route taking the transmission rate and the packet size into account. Link cost estimation may be performed using three or more reference values about the packet size or the payload size.

With the arrangement of the third embodiment, the optimum packet transmission route can be appropriately selected taking the packet size into account in an ad hoc wireless network under frequently changing network topology and radio environment over time and locations.

What is claimed is:

1. A packet transmission system comprising:
   a plurality of wireless base stations; and
   one or more terminal devices belonging to one of the wireless base stations;
   wherein each of the wireless base stations has
   a location table to record an address of each of said plurality of wireless base stations that structure a network, and for each of said plurality of wireless base stations that are recorded, addresses of the terminal devices that are currently existing under the respective wireless base station,
   a short packet route control table and a long packet route control table that indicate for each of the other wireless base stations that structure the network which wireless base stations are along a first route for a short packet and along a second route for a long packet, and wherein
   each of the wireless base stations is configured to exchange the information in the location table with the other wireless base stations to update the location table; and
   each of the wireless base stations is configured to, upon receiving a packet, identify a wireless base station to which the source terminal device or the destination terminal device currently belongs according to the location table, based on a source address of the source terminal device or a destination address of the destination terminal device, respectively, included in the received packet, and to determine whether the packet is a short packet or a long packet to find a next hop based on either the short packet route control table or the long packet route control table, respectively, to find the next hop, and transmit the packet to the next hop.

2. The packet transmission system according to claim 1, wherein at least one of the wireless base stations includes:
   a cost estimation unit configured to send a route search packet to adjacent wireless base stations that configure the network so that the adjacent wireless base station add up route costs to gather information on the first route and the second route for the short packet route control table and the long packet route control table, respectively.

3. A wireless base station constituting, together with other wireless base stations, a packet transmission system using a wireless packet network, comprising:
a location table to record an address of each of the wireless base stations in said packet transmission system, and for each of said plurality of wireless base stations that are recorded, addresses of each of terminal devices that are currently participating in the network and existing under a respective one of the wireless base stations;
a short packet route control table and a long packet route control table that indicate for each of the other wireless base stations that structure the network which wireless base station are long a first route for a short packet and along a second route for a long packet;
a route determination unit configured to identify a wireless base station to which the source terminal device or the destination terminal device currently belongs according to the location table, based on a source address of the source terminal device or a destination address of the destination terminal device included in a received packet, and to determine whether the packet is a short packet or a long packet to find a next hop based on either the short packet route control table or the long packet route control table, respectively, and find the next hop; and
a packet transmission unit configured to transmit the packet to the next hop according to the determination result.

4. The wireless base station of claim 3, wherein the packet transmission unit transmits a message packet reporting participation of a new terminal device when the new terminal device belongs to the wireless base station.

5. The wireless base station of claim 3, wherein when the receiving unit receives a message packet reporting a new terminal device having belonged to one of the other wireless base stations, the route determination unit updates the location table.

6. The wireless base station of claim 3, wherein when the receiving unit receives a packet from a source terminal device belonging to this wireless base station, the packet transmission unit writes an address of a destination side wireless base station to which a destination terminal device currently belongs in the packet, and then transmits the packet to the next hop according to either the short packet route control table or the long packet route control table.

7. The wireless base station according to claim 3, further comprising:
a cost estimation unit configured to send a route search packet to adjacent wireless base stations that configure the network so that the adjacent wireless base station add up route costs to gather information on the first route and the second route for the short packet route control table and the long packet route control table, respectively.

8. A packet transmission system comprising a plurality of wireless base stations and one or more terminal devices belonging to one of the wireless base stations,
wherein each of the wireless base stations includes:
a location table recording an address of each of said plurality wireless base stations that structure a network, and for each of said plurality of wireless base stations that are recorded, addresses of the terminal devices that are currently associated with a respective wireless base station,
a short packet route control table and a long packet route control table that indicates for each of the other wireless base stations that structure the network which wireless base stations are along a first route for a short packet and along a second route for a long packet,
a packet creating unit configured, if said one of the wireless base stations is a wireless base station that first received a packet from a terminal device, to add address information of a wireless base station, to which the source terminal device or the destination terminal device of the received packet currently belongs, to the received packet with reference to the location table,
a route determination unit configured, upon receiving a packet from another wireless base station, to determine a next hop wireless base station to which the received packet is to be forwarded, based upon the address information of the wireless base station to which the source terminal device or the destination terminal device currently belongs, the address information included in the packet, and based upon either the short packet route control table or the long packet route control table, respectively, by first determining whether the packet is a short packet or a long packet,
a packet transmission unit configured to transmit the packet to the next hop wireless base station determined by the route determination unit, and
a location table updating unit configured to exchange the information in the location table with the other wireless base stations and update the location table of this wireless base station.

9. The packet transmission system of claim 8,
wherein the packet transmission unit of a corresponding wireless base station is further configured to transmit a message packet reporting participation of a new terminal device when the new terminal device belongs to the corresponding wireless base station; and
wherein the location table updating unit is further configured to update the location table when the message packet is received from another wireless base station.

10. The packet transmission system of claim 8,
wherein the packet creating unit is configured, if said one of the wireless base stations is a wireless base station that first receives a packet from a terminal device, to add ID information of a transmission route for this packet to the receive packet, and
wherein upon receiving a packet from another wireless base station, the route determination unit determines the next hop wireless base station from the ID information of the transmission route included in the received packet, with reference to the route control table.

11. The packet transmission system according to claim 8,
wherein at least one of the wireless base stations includes:
a cost estimation unit configured to send a route search packet to adjacent wireless base stations that configure the network so that the adjacent wireless base station add up route costs to gather information on the first route and the second route for the short packet route control table and the long packet route control table, respectively.

12. A wireless base station used in a wireless packet transmission system, comprising:
a location table to record an address of each of said plurality wireless base stations that structure a network, and for each of said plurality of wireless base stations that are recorded, addresses of the terminal devices that are currently associated with a respective wireless base station,
a short packet route control table and a long packet route control table that indicate for each of the other wireless base stations that structure a network in the wireless packet transmission system which wireless base station are along a first route for a short packet and along a second route for a long packet, a packet creating unit configured, if this wireless base station is one that first received a packet from a terminal device, to add address information of a wireless base station, to which the source terminal device or the destination terminal device of the received packet currently belongs, to the received packet with reference to the location table, a route determination unit configured, upon receiving a packet from another wireless base station, to determine a next hop wireless base station to which the received packet is to be forwarded, based upon the address information of the wireless base station to which the source terminal device or the destination terminal device currently belongs, the address information included in the packet, and based upon either the short packet route control table or the long packet route control table, respectively, by first determining whether the packet is a short packet or a long packet, a packet transmission unit configured to transmit the packet to the next hop wireless base station determined by the route determination unit, and a location table updating unit configured to exchange the information in the location table with the other wireless base stations and update the location table of this wireless base station.

13. The wireless base station of claim 12, wherein the packet transmission unit configured to transmit a message packet reporting participation of a new terminal device when the new terminal device belongs to this wireless base station; and wherein the location table updating unit configured to update the location table when the message packet is received from another wireless base station.

14. The wireless base station according to claim 12, further comprising:

a cost estimation unit configured to send a route search packet to adjacent wireless base stations that configure the network so that the adjacent wireless base station add up route costs to gather information on the first route and the second route for the short packet route control table and the long packet route control table, respectively.

* * * * *